(12) United States Patent
Katou et al.

(10) Patent No.: US 10,268,057 B2
(45) Date of Patent: Apr. 23, 2019

(54) FPC-ATTACHED OPTICAL MODULATOR AND OPTICAL TRANSMISSION APPARATUS USING SAME

(71) Applicant: Sumitomo Osaka Cement Co., Ltd, Tokyo (JP)

(72) Inventors: Kei Katou, Tokyo (JP); Toru Sugamata, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 15/851,851

(22) Filed: Dec. 22, 2017

(65) Prior Publication Data

US 2018/0180908 A1 Jun. 28, 2018

(30) Foreign Application Priority Data

Dec. 28, 2016 (JP) ................... 2016-254618

(51) Int. Cl.
| | | |
|---|---|---|
| *G02F 1/035* | (2006.01) | |
| *G02F 1/03* | (2006.01) | |
| *G02F 1/225* | (2006.01) | |
| *G02F 1/21* | (2006.01) | |

(52) U.S. Cl.
CPC ............ *G02F 1/0305* (2013.01); *G02F 1/035* (2013.01); *G02F 1/225* (2013.01); *G02F 2001/212* (2013.01); *G02F 2202/20* (2013.01)

(58) Field of Classification Search
None
See application file for complete search history.

(56) References Cited

U.S. PATENT DOCUMENTS

| | | | | |
|---|---|---|---|---|
| 6,741,379 | B2* | 5/2004 | Kaitoh | G02F 1/0305 |
| | | | | 359/245 |
| 9,075,254 | B2* | 7/2015 | Takemura | G02F 1/0316 |
| 9,651,804 | B2 | 5/2017 | Sugiyama et al. | |
| 2012/0051683 | A1* | 3/2012 | Sugiyama | G02F 1/035 |
| | | | | 385/1 |
| 2016/0011488 | A1* | 1/2016 | Sugiyama | G02F 1/0121 |
| | | | | 398/188 |
| 2017/0082875 | A1* | 3/2017 | Sugiyama | G02F 1/0121 |
| 2018/0088361 | A1* | 3/2018 | Sugamata | G02F 1/0316 |
| 2018/0231866 | A1* | 8/2018 | Sugamata | G02F 1/2255 |

FOREIGN PATENT DOCUMENTS

| | | |
|---|---|---|
| JP | 2016-020928 A1 | 2/2016 |
| JP | 2016109941 A | 6/2016 |

* cited by examiner

*Primary Examiner* — Tina M Wong
(74) *Attorney, Agent, or Firm* — Greer, Burns & Crain, Ltd.

(57) ABSTRACT

An optical modulator includes: an optical modulation element which is accommodated in a housing and has a signal electrode; a lead pin for inputting a high-frequency signal; a relay substrate in which a conductor pattern which electrically connects the lead pin and the signal electrode is formed; and a conductive extension portion which extends along a length direction of the lead pin in a range which includes at least a position of a connection portion between the lead pin and the conductor pattern, in which the extension portion is electrically connected to the housing.

11 Claims, 14 Drawing Sheets

DETAIL OF PORTION A

IIB-IIB LINE SECTIONAL VIEW IN DIRECTION OF ARROW

DETAIL OF PORTION F

XIVB-XIVB LINE SECTIONAL VIEW IN DIRECTION OF ARROW

FPC-ATTACHED OPTICAL MODULATOR AND OPTICAL TRANSMISSION APPARATUS USING SAME

CROSS-REFERENCE TO RELATED APPLICATIONS

This application claims the benefit of Japanese Patent Application No. 2016-254618 filed Dec. 28, 2016, the disclosure of which is herein incorporated by reference in its entirety.

BACKGROUND OF THE INVENTION

Field of the Invention

The present invention relates to an optical modulator and in particular, to an optical modulator which is provided with a relay substrate which performs a relay between a conductor (for example, a lead pin) for inputting a high-frequency signal, which is provided in a housing, and an electrode of an optical modulation element, and an optical transmission apparatus using the optical modulator.

Description of Related Art

In high-frequency and high-capacity optical fiber communication systems, optical modulators having a waveguide-type optical modulation element incorporated therein are frequently used. Among them, an optical modulation element in which $LiNbO_3$ (hereinafter, also referred to as LN) having an electro-optic effect is used for a substrate can realize an optical modulation characteristic with a small light loss and a wide band, and therefore, it is widely used for a high-frequency and high-capacity optical fiber communication system.

The optical modulation element using the LN substrate is provided with a Mach-Zehnder optical waveguide, a RF electrode for applying a high-frequency signal, which is a modulation signal, to the optical waveguide, and a bias electrode for performing a variety of adjustments in order to favorably maintain modulation characteristics in the waveguide. Then, these electrodes provided in the optical modulation element are connected to a circuit board, on which an electronic circuit for causing the optical modulator to perform a modulation operation is mounted, via lead pins or connectors provided in a housing of the optical modulator, which houses the optical modulation element.

As a modulation form in the optical fiber communication system, in response to the recent trend toward an increase in transmission capacity, multilevel modulation such as Quadrature Phase Shift Keying (QPSK) or Dual Polarization-Quadrature Phase Shift Keying (DP-QPSK), or a transmission format with polarization multiplexing incorporated into the multilevel modulation is the main stream and is used in a core optical transmission network. However, it is also being introduced into a metro network.

An optical modulator which performs QPSK modulation (a QPSK optical modulator), or an optical modulator which performs DP-QPSK modulation (a DP-QPSK optical modulators) is provided with a plurality of Mach-Zehnder optical waveguides having a nested structure which is called a so-called nested type, and is also provided with a plurality of high-frequency signal electrodes and a plurality of bias electrodes (refer to, for example, Japanese Laid-open Patent Publication No. 2016-109941). For this reason, the size of a housing of the optical modulator tends to be increased. However, in recent years, conversely, a demand for the downsizing of the modulator has increased.

As a measure responding to this downsizing demand, in the related art, an optical modulator which enables electrical connection with an external circuit board by replacing a push-on type coaxial connector provided in a housing of an optical modulator as an interface of the RF electrode with lead pins similar to an interface for a bias electrode and a flexible printed circuit (FPC) which is electrically connected to these lead pins has been proposed (refer to, for example, Japanese Laid-open Patent Publication No. 2016-109941).

For example, in the DP-QPSK optical modulator, an optical modulation element which is configured of four Mach-Zehnder optical waveguides each having a RF electrode is used. In this case, if four push-on type coaxial connectors are provided in a housing of an optical modulator, an increase in the size of the housing is inevitable. However, if lead pins and an FPC are used instead of the coaxial connector, downsizing becomes possible.

Further, the lead pins of the housing of the optical modulator and a circuit board on which an electronic circuit (a drive circuit) for causing the optical modulator to perform a modulation operation is mounted are connected to each other through the FPC, and therefore, it is not necessary to perform the excess length treatment of a coaxial cable which has been used in the related art, and it is possible to reduce the mounting space of the optical modulator in an optical transmission apparatus.

In such an optical modulator having the lead pins for inputting a high-frequency electrical signal provided in the housing, in general, the lead pins and the electrodes of the optical modulation element accommodated in the housing are connected to each other through a relay substrate disposed in the housing (refer to, for example, Japanese Laid-open Patent Publication No. 2016-109941).

FIG. 13A, FIG. 13B, and FIG. 13C are diagrams showing an example of the configuration of the optical modulator of the related art as described above. Here, FIG. 13A is a top view showing the configuration of an optical modulator 1300 of the related art mounted on a circuit board 1330, FIG. 13B is a side view of the optical modulator 1300 of the related art, and FIG. 13C is a bottom view of the optical modulator 1300 of the related art. The optical modulator 1300 is provided with an optical modulation element 1302, a housing 1304 which houses the optical modulation element 1302, a flexible printed circuit (FPC) 1306, an optical fiber 1308 to input light to the optical modulation element 1302, and an optical fiber 1310 which leads light which is output from the optical modulation element 1302 to the outside of the housing 1304.

The optical modulation element 1302 is a DP-QPSK optical modulator which is provided with four Mach-Zehnder optical waveguides provided on, for example, an LN substrate, and four high-frequency electrodes (RF electrodes) 1312*a*, 1312*b*, 1312*c*, and 1312*d* which are respectively provided on the Mach-Zehnder optical waveguides and modulate light waves propagating through the optical waveguides.

The housing 1304 is configured of a case 1314*a* to which the optical modulation element 1302 is fixed, and a cover 1314*b*. In order to facilitate the understanding of the configuration of the inside of the housing 1304, in FIG. 13A, only a part of the cover 1314*b* is shown on the left side in the drawing.

The case 1304*a* is provided with four lead pins 1316*a*, 1316*b*, 1316*c*, and 1316*d*. The lead pins 1316*a*, 1316*b*, 1316*c*, and 1316*d* are sealed with glass sealing portions 1400a, 1400b, 1400c, and 1400d (described later), extend from the bottom surface (the surface shown in FIG. 13C) of the housing 1304 to the outside, and are connected to through-holes formed on the FPC 1306 with solder and the like.

One end of each of the lead pins 1316a, 1316b, 1316c, and 1316d is electrically connected to one end of each of the RF electrodes 1312a, 1312b, 1312c, and 1312d of the optical modulation element 1302 through a relay substrate 1318.

The other end of each of the RF electrodes 1312a, 1312b, 1312c, and 1312d is electrically terminated by a terminator 1320.

FIG. 14A is a partial detail view of a portion F of the optical modulator 1300 shown in FIG. 13A, and FIG. 14B is a cross-sectional view of the optical modulator 1300 taken along line XIVB-XIVB in FIG. 13A and viewed in a direction of an arrow. The lead pins 1316a, 1316b, 1316c, and 1316d extend from the inside of the housing 1304 to the outside of the housing 1304 through the glass sealing portions 1400a, 1400b, 1400c, and 1400d provided in the case 1314a, protrude from the lower surface (the surface shown in FIG. 13C) of the housing 1304, and are solder-fixed to the through-holes of the FPC 1306.

The lead pins 1316a, 1316b, 1316c, and 1316d are disposed in the vicinity of a side (a lead pin-side edge 1410) on the lower side of the relay substrate 1318 in FIG. 14A (the left side of the relay substrate 1318 in FIG. 14B) and at positions facing the respective end portions of conductor patterns 1402a, 1402b, 1402c, and 1402d which are provided on the relay substrate 1318. Here, portions of the lead pin, at which the lead pins 1316a, 1316b, 1316c, and 1316d face the respective end portions of the conductor patterns 1402a, 1402b, 1402c, and 1402d, are referred to as connection portions 1404a, 1404b, 1404c, and 1404d, respectively.

The lead pins 1316a, 1316b, 1316c, and 1316d are respectively electrically connected to the conductor patterns 1402a, 1402b, 1402c, and 1402d with solder 1408a, 1408b, 1408c, and 1408d at the connection portions 1404a, 1404b, 1404c, and 1404d.

The conductor patterns 1402a, 1402b, 1402c, and 1402d which are provided on the relay substrate 1318 are electrically connected to the RF electrodes 1312a, 1312b, 1312c, and 1312d of a lower end portion of the optical modulation element 1302 (the left end of the optical modulation element 1302 in FIG. 14B), disposed in the vicinity of a side (a modulator-side edge 1412) on the upper side of the relay substrate 1318 in FIG. 14A (the right side of the relay substrate 1318 in FIG. 14B), by, for example, gold wires 1406a, 1406b, 1406c, and 1406d, respectively.

The conductor patterns 1402a, 1402b, 1402c, and 1402d which are formed on the relay substrate 1318 are usually configured as linear patterns parallel to each other in order to minimize a signal propagation loss and a skew (a propagation delay time difference) by minimizing the propagation distance of the high-frequency signal from the respective lead pins 1316a, 1316b, 1316c, and 1316d to the respective RF electrodes 1312a, 1312b, 1312c, and 1312d corresponding to the respective lead pins 1316a, 1316b, 1316c, and 1316d. Therefore, the optical modulator 1300 is configured such that the interval between the respective lead pins 1316a, 1316b, 1316c, and 1316d is the same as the interval between the respective RF electrodes 1312a, 1312b, 1312c, and 1312d.

Further, in general, an electrical signal which is input from the lead pin 1316a or the like sealed by the glass sealing portion 1400a or the like is a high-frequency signal (a microwave signal) of several tens of GHz. For this reason, the designed impedance (a designed value of characteristic impedance) of the lead pin 1316a or the like, the designed impedance of the conductor pattern 1402a or the like which is formed on the relay substrate 1318, and the designed impedance of the RF electrode 1312a or the like of the optical modulation element 1302 are set to, for example, the same value (for example, 50 Ω), whereby impedance matching is achieved. In this way, reflection or radiation of the high-frequency signal in a high-frequency transmission channele from the lead pin 1316a or the like to the RF electrode 1312a or the like of the optical modulation element 1302 through the conductor pattern 1402a or the like on the relay substrate 1318 is suppressed.

With the above configuration, in the optical modulator 1300, the high-frequency electrical signals input from conductor patterns 1332a, 1332b, 1332c, and 1332d (FIG. 13A) formed on the circuit board 1330 to the lead pins 1316a, 1316b, 1316c, and 1316d through the FPC 1306 are input to the RF electrodes 1312a, 1312b, 1312c, and 1312d of the optical modulation element 1302 through the relay substrate 1318.

However, even in the optical modulator 1300 in which impedance matching is achieved as described above, there is a case where a problem such as a noise signal component being superimposed on each RF electrode 1312a or the like of the optical modulation element 1302, so that a high-frequency characteristic such as an eye pattern extinction ratio or a jitter of the optical modulator 1300 deteriorates and the transmission characteristics of the optical transmission apparatus deteriorate, arises.

As a result of intensive studies on this problem, the inventors of the present invention have found that one cause of this problem is impedance mismatch in the portion of the connection portion 1404a or the like (or the portion and a peripheral portion thereof) which includes the solder 1408a or the like connecting the conductor pattern 1402a or the like and the lead pin 1316a or the like, which is generated at the time of the manufacturing of the optical modulator 1300.

That is, if the lead pin 1316a or the like and the conductor pattern 1402a or the like are connected to each other with the solder 1408a or the like at the connection portion 1404a or the like at the time of the manufacturing of the optical modulator 1300, for example, due to the amount, shape, or the like of the solder 1408a or the like, and/or due to the distance between the lead pin 1316a or the like and an end portion of the conductor pattern 1402a or the like, or the like, the characteristic impedance at the connection portion 1404a or the like which includes the solder 1408a or the like changes to a value different from a design value. For this reason, a difference in the characteristic impedance at the connection portion 1404a or the like occurs with respect to the characteristic impedance of the lead pin 1316a or the like and the conductor pattern 1402a or the like. As a result, electromagnetic radiation is generated in the portion of the connection portion 1404a or the like (or the portion and the vicinity thereof), crosstalk occurs between the high-frequency signals propagating through the respective high-frequency signal paths which are configured with the lead pin 1316a or the like and the conductor pattern 1402a or the like, and the crosstalk becomes noise, thereby deteriorating the high-frequency characteristic of the optical modulator 1300.

In general, in a connection portion between two high-frequency transmission media, impedance mismatch easily occurs because an electrical characteristic is discontinuous at the connection portion. As described above, in the optical modulator 1300, the conductor pattern 1402a or the like on the relay substrate 1318 and the lead pin 1316a or the like are connected to each other by, for example, the solder 1408a or the like at the connection portion 1404a or the like. The characteristic impedance of the solder 1408a or the like filling the gap between the conductor pattern 1402a or like and the lead pin 1316a or the like depends on not only the electrical characteristic (determined by, for example, a component or a composition ratio) of the solder but also the shape of the solder 1408a or the like (not only the length or width of the solder 1408a or the like along a high-frequency propagation direction but also a spatial shape such as surface unevenness of the solder portion).

For this reason, in a case of trying to manufacture the optical modulator 1300 such that the characteristic impedance in the connection portion 1404a or the like becomes a constant value equal to the characteristic impedance of the conductor pattern 1402a or the like by connecting conductor pattern 1402a or the like and the lead pin 1316a or the like using the solder 1408a or the like at the connection portion 1404a or the like without changing the characteristic impedance of the portion of the connection portion 1404a or the like from the design value, extremely high skill in soldering work or the like may be required.

Further, if impedance mismatch occurs in the portion of the connection portion 1404a or the like (or the portion and the periphery thereof) which includes the solder 1408a or the like, between the lead pin 1316a or the like and the conductor pattern 1402a or the like, the high-frequency signal propagating through the lead pin 1316a or the like becomes electromagnetic radiation at the impedance mismatch portion and is radiated to a space. For this reason, crosstalk occurs between the respective high-frequency transmission paths, which are configured with the lead pin 1316a or the like and the conductor pattern 1402a or the like, through the electromagnetic radiation. In particular, in the case of a device in which four RF electrodes perform an optical modulation operation in cooperation with each other, like a DP-QPSK modulator, noise in each high-frequency transmission path caused by the crosstalk finally appears as a synergistic effect of four noises superimposed on each of the four RF electrodes and deteriorates a high-frequency characteristic such as an eye pattern extinction ratio or a jitter of modulated light.

SUMMARY OF THE INVENTION

From the above background, in an optical modulator which is provided with a relay substrate which performs a relay between lead pins for inputting a high-frequency signal and electrodes of an optical modulation element, it is desired to prevent deterioration of an optical modulation characteristic (for example, a high-frequency characteristic such as an eye pattern extinction ratio or a jitter) by suppressing electromagnetic radiation caused by impedance mismatch occurring in the connection portion between the conductor pattern formed on the relay substrate and the lead pin provided at the housing.

An aspect of the present invention is an optical modulator including: an optical modulation element which is accommodated in a housing and has a signal electrode; a lead pin for inputting a high-frequency signal; a relay substrate in which a conductor pattern which electrically connects the lead pin and the signal electrode is formed; and a conductive extension portion which extends along a length direction of the lead pin in a range which includes at least a position of a connection portion between the lead pin and the conductor pattern, in which the extension portion is electrically connected to the housing.

According to another aspect of the present invention, characteristic impedance of the connection portion in an operating frequency region of the optical modulation element before the lead pin and the conductor pattern are actually electrically connected to each other is higher than characteristic impedance of the lead pin and/or the conductor pattern.

According to another aspect of the present invention, a distance in which the extension portion extends in the range is larger than a thickness of the conductor pattern on the relay substrate.

According to another aspect of the present invention, the extension portion and a ground pattern formed on the relay substrate are electrically connected to each other by an electric conductor.

According to another aspect of the present invention, the extension portion includes portions facing each other across the lead pin, and each of the portions facing each other extends along a length direction of the lead pin in a range which includes a position of the connection portion.

According to another aspect of the present invention, the extension portion is configured so as to enclose at least partially the lead pin in a radial direction of said lead pin by a portion which includes the portions facing each other.

According to another aspect of the present invention, a plurality of the lead pins are provided, the extension portion includes a enclosing portion which inclusively encloses at least two lead pins adjacent to each other, and a distance between one of the lead pins inclusively enclosed by the enclosing portion and a lead pin which is adjacent to said one of the lead pins and is not inclusively enclosed by said enclosing portion is wider than a distance between the lead pins inclusively enclosed by said enclosing portion.

According to another aspect of the present invention, the portions facing each other are electrically connected to each other by an electric conductor disposed across an end portion in the length direction of the lead pin.

According to another aspect of the present invention, the extension portion is fabricated integrally with the housing.

According to another aspect of the present invention, the extension portion is fabricated as a separate body from the housing and is fixed and electrically connected to the housing.

According to another aspect of the present invention, the extension portion is provided with a pedestal portion for fixing the relay substrate.

According to another aspect of the present invention, the extension portion is in contact with the relay substrate.

According to another aspect of the present invention, the extension portion is provided at a predetermined distance from the relay substrate.

Another aspect of the present invention is an optical transmission apparatus including: the optical modulator according to any one of the aspects described above; and an electronic circuit which outputs an electric signal for causing the optical modulator to perform a modulation operation.

DETAILED DESCRIPTION OF THE INVENTION

Hereinafter, embodiments of the present invention will be described with reference to the drawings.

First Embodiment

Figure 1A:
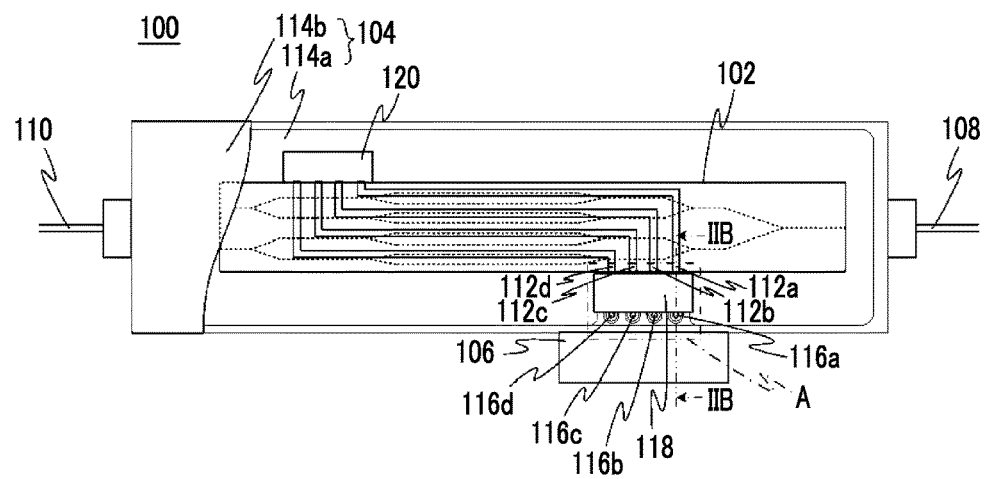
FIG. 1A is a top view of an optical modulator according to a first embodiment of the present invention, showing a configuration of the optical modulator.
Figure 1B:
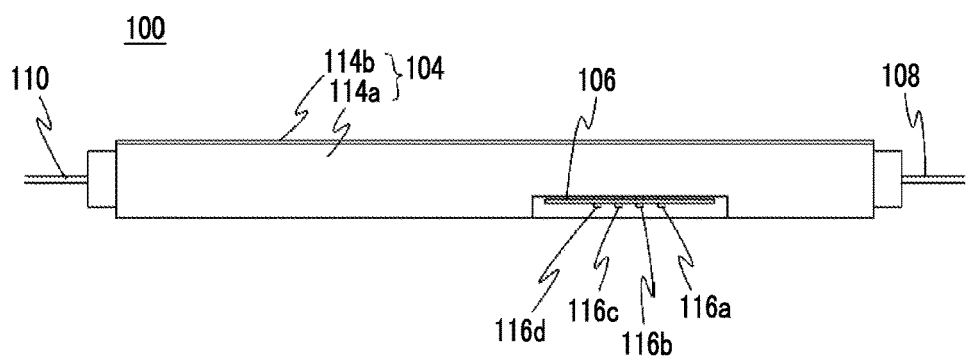
FIG. 1B is a side view of the optical modulator according to the first embodiment of the present invention.
Figure 1C:
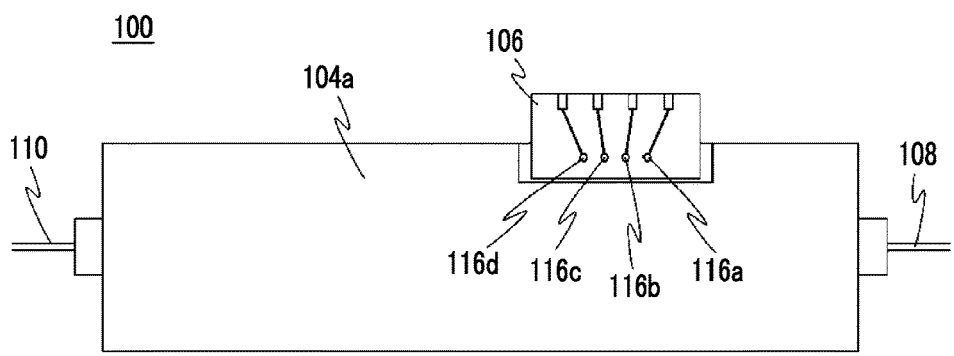
FIG. 1C is a bottom view of the optical modulator according to the first embodiment of the present invention.

First, a first embodiment of the present invention will be described. FIG. 1A, FIG. 1B, and FIG. 1C are diagrams showing the configuration of an optical modulator according to the first embodiment of the present invention. Here, FIG. 1A, FIG. 1B, and FIG. 1C are respectively a top view, a side view, and a bottom view of an optical modulator 100 according to the first embodiment.

The optical modulator 100 is provided with an optical modulation element 102, a housing 104 which houses the optical modulation element 102, a flexible printed circuit (FPC) 106, an optical fiber 108 to input light to the optical modulation element 102, and an optical fiber 110 which leads the light which is output from the optical modulation element 102 to the outside of the housing 104.

The optical modulation element 102 is a DP-QPSK optical modulator which is provided with four Mach-Zehnder optical waveguides provided on, for example, an LN substrate and four high-frequency electrodes (RF electrodes) 112a, 112b, 112c, and 112d which are respectively provided on the Mach-Zehnder optical waveguides and modulate light waves propagating through the optical waveguides. Two lights which are output from the optical modulation element 102 are polarization-combined by, for example, a lens optical system (not shown in the drawings) and are led to the outside of the housing 104 through the optical fiber 110.

The housing 104 is configured of a case 114a to which the optical modulation element 102 is fixed, and a cover 114b. In order to facilitate the understanding of the configuration in the housing 104, in FIG. 1A, only a part of the cover 114b is shown on the left side in the drawing. However, in fact, the cover 114b is disposed so as to cover the whole of the box-shaped case 114a and hermetically seals the inside of the housing 104.

The case 114a is provided with four lead pins 116a, 116b, 116c, and 116d which are conductors for inputting a high-frequency signal. The lead pins 116a, 116b, 116c, and 116d extend from the bottom surface (the surface shown in FIG. 1C) of the housing 104 to the outside and are connected to through-holes formed on the FPC 106 with solder or the like. Further, the case 114a is configured of a conductive material (for example, metal such as stainless steel, or a material coated with a thin metal film such as gold) and is connected to a ground line through the FPC 106 or by bringing the case 104a into contact with an external structure when mounting the optical modulator 100 on a transmission apparatus or the like.

Each of the lead pins 116a, 116b, 116c, and 116d is electrically connected to one end of each of the RF electrodes 112a, 112b, 112c, and 112d of the optical modulation element 102 through a relay substrate 118. The configuration of the relay substrate 118 will be described later.

Each of the RF electrodes 112a, 112b, 112c, and 112d is designed such that characteristic impedance reaches a predetermined value (in this embodiment, for example, 50 Ω) in an operation frequency range, and the other ends of the RF electrodes 112a, 112b, 112c, and 112d are terminated by a terminator 120 having impedance (for example, 50 Ω) of the predetermined value. In the following, the "characteristic impedance" refers to characteristic impedance in the operation frequency range of the optical modulation element 102 unless otherwise specified.

Figure 2A:
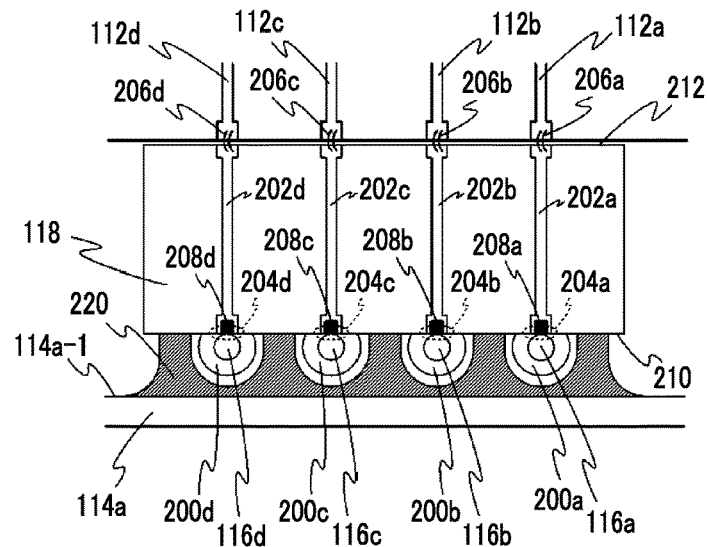
FIG. 2A is a partial detail view of a portion A of the optical modulator shown in FIG. 1A.
Figure 2B:
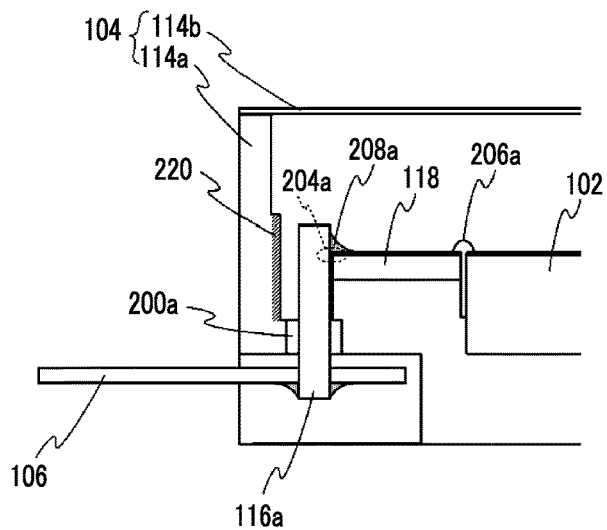
FIG. 2B is a cross-sectional view of the optical modulator taken along line IIB-IIB in FIG. 1A and viewed in a direction of an arrow.

FIG. 2A is a partial detail view of a portion A of the optical modulator 100 shown in FIG. 1A, and FIG. 2B is a cross-sectional view of the optical modulator 100 taken along line IIB-IIB in FIG. 1A and viewed in a direction of an arrow. Four conductor patterns 202a, 202b, 202c, and 202d are provided on the relay substrate 118. The conductor patterns 202a, 202b, 202c, and 202d are, for example, linear patterns and are respectively electrically connected to the RF electrodes 112a, 112b, 112c, and 112d of a lower end portion in the drawing of the optical modulation element 102 (the left end of the optical modulation element 102 in FIG. 2B), disposed in the vicinity of a side (a modulator-side edge 212) on the upper side of the relay substrate 118 in FIG. 2A (the right side of the relay substrate 118 in FIG. 2B), by, for example, gold wires 206a, 206b, 206c, and 206d.

The conductor patterns 202a, 202b, 202c, and 202d which are provided on the relay substrate 118 are designed so as to have the same characteristic impedance (for example, 50 Ω) as the RF electrodes 112a, 112b, 112c, and 112d of the optical modulation element 102. The conductor patterns 202a, 202b, 202c, and 202d can be configured by using a known line structure as a signal line for a high frequency, such as a microstrip line, a coplanar line, a grounded coplanar line, for example, and ground patterns (not shown in the drawings) are also provided on the relay substrate 118 in accordance with the structure. Further, each of the ground patterns is connected to an external ground line through an additional lead pin (not shown in the drawings) connected to a ground conductor pattern (not shown in the drawings) on the FPC 106, and/or additional electrical connection with the conductive housing 104, according to the related art, and is connected to a ground pattern (not shown in the drawings) on the optical modulation element 102 by wire bonding or the like.

The lead pins 116a, 116b, 116c, and 116d are designed so as to have the same characteristic impedance (for example, 50 Ω) as the RF electrodes 112a, 112b, 112c, and 112d of the optical modulation element 102, extend from the inside of the housing 104 to the outside of the housing 104 through glass sealing portions 200a, 200b, 200c, and 200d provided in the case 114a, protrude from the lower surface (the surface shown in FIG. 1C) of the housing 104, and are solder-fixed to the through holes of the FPC 106.

Further, the lead pins 116a, 116b, 116c, and 116d are disposed in the vicinity of a side (a lead pin-side edge 210) of the lower side of the relay substrate 118 in FIG. 2A (the left side of the relay substrate 118 in FIG. 2B) and at positions facing the respective end portions of the conductor patterns 202a, 202b, 202c, and 202d provided on the relay substrate 118.

Here, portions of the lead pin-side edge 210, at which the lead pins 116a, 116b, 116c, and 116d face the respective end portions of the conductor patterns 202a, 202b, 202c, and 202d, are referred to as connection portions 204a, 204b, 204c, and 204d, respectively.

The lead pins 116a, 116b, 116c, and 116d are respectively electrically connected to the conductor patterns 202a, 202b, 202c, and 202d with solder 208a, 208b, 208c, and 208d at the connection portions 204a, 204b, 204c, and 204d.

With the above configuration, a high-frequency signal input from, for example, a drive device (for example, a printed wiring board (PWB) on which a drive circuit is configured) provided outside the housing 104 to the lead pins 116a, 116b, 116c, and 116d through the FPC 106 is input to the RF electrodes 112a, 112b, 112c, and 112d of the optical modulation element 102 through the conductor patterns 202a, 202b, 202c, and 202d on the relay substrate 118, and thus an optical modulation operation is performed in the optical modulation element 102.

Figure 3:
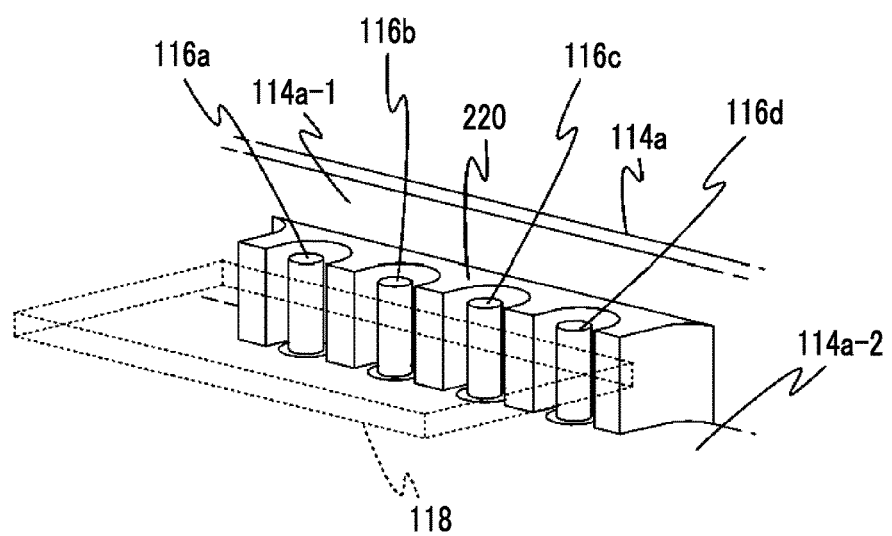
FIG. 3 is a perspective view showing a partial detail of the periphery of an extension portion provided at a case of the optical modulator according to the first embodiment shown in FIG. 2A.

In particular, in this embodiment, in addition to the above configuration, an extension portion 220 (the hatched portion in FIG. 2A and FIG. 2B) formed integrally with the case 114a is provided at a portion in the vicinity of the lead pins 116a, 116b, 116c, and 116d in the case 114a. FIG. 3 is a perspective view showing a partial detail of the periphery of the extension portion 220 provided at the case 114a. In FIG. 3, in order to facilitate understanding of the configuration of the extension portion 220, only the case 114a, the extension portion 220, the lead pins 116a, 116b, 116c, and 116d, and the relay substrate 118 (indicated by a dotted line in the drawing) are shown, and with respect to other constituent elements, descriptions thereof are omitted.

The extension portion 220 is configured so as to extend from an inner side surface 114a-1 of the case 114a and enclose each of the lead pins 116a, 116b, 116c, and 116d in a radial direction of the lead pin and is configured so as to extend from a bottom surface 114a-2 of the case 114a along a length direction of each of the lead pins 116a, 116b, 116c, and 116d.

The optical modulator 100 is configured such that due to providing the extension portion 220, the design (or theoretical) characteristic impedance (hereinafter simply referred to as "design characteristic impedance") of the portions of the connection portions 204a, 204b, 204c, and 204d (or the connection portion and a peripheral portion thereof) before the lead pins 116a, 116b, 116c, and 116d and the conductor patterns 202a, 202b, 202c, and 202d are connected to each other by the solder 208a, 208b, 208c, and 208d becomes a value (for example, 53 Ω) larger than the characteristic impedance (in this embodiment, 50 Ω) of the lead pins 116a, 116b, 116c, and 116d and the conductor patterns 202a, 202b, 202c, and 202d.

The inventors of the invention of this application have minutely investigated variation in manufacturing of an optical modulator which is provided with a lead pin provided in a case and a relay substrate which performs a relay between the lead pin and an optical modulation element electrode, and as a result, have found that the lead pin and the conductor pattern on the relay substrate are connected to each other with solder and the like, so that the characteristic impedance at the connection portion (or the connection portion and a peripheral portion thereof) between the lead pin and the conductor pattern changes and distributes in a direction in which it becomes smaller than the design characteristic impedance.

The reason why the impedance decreases as described above is assumed to be caused by the fact that at least a part of an area which should originally be a space or air layer is filled with solder for the reason of, for example, the fact that in reality, the amount of solder at the connection portion is large compared to an ideal solder connection state and the position of the solder deviate from the ideal, so that solder enters the gap between the relay substrate and the lead pin.

The present invention is based on the above finding, and in the optical modulator 100 of this embodiment, as described above, the extension portion 220 extending along the length direction of the lead pins 116a, 116b, 116c, and 116d is provided at the case 114a which is connected to a ground line. The design characteristic impedance of the portions of the connection portions 204a, 204b, 204c, and 204d (or the connection portion and a peripheral portion thereof) is configured so as to be a value larger than the characteristic impedance of the lead pins 116a, 116b, 116c, and 116d and the conductor patterns 202a, 202b, 202c, and 202d. The characteristic impedance of the connection portion can be increased by adjusting design parameters such as the distance between the lead pin and the conductor pattern on the relay substrate at the connection portion, the dielectric constant of the relay substrate, or the distance between the lead pin and the inner wall surface of the case or the extension portion.

For this reason, in the optical modulator 100, the characteristic impedance of the portions of the connection portions 204a, 204b, 204c, and 204d (or the connection portion and a peripheral portion thereof) almost coincides with the characteristic impedance of the lead pins 116a, 116b, 116c, and 116d and the conductor patterns 202a, 202b, 202c, and 202d after the manufacturing of the optical modulator 100 (that is, after a decrease in the characteristic impedance due to connecting the lead pins 116a or the like and the conductor pattern 202a or the like with the solder 208a or the like). As a result, occurrence of impedance mismatch in the connection portions and/or the vicinity thereof is suppressed and electromagnetic radiation in the portion and/or the vicinity thereof is suppressed. Therefore, occurrence of noise due to crosstalk through the electromagnetic radiation between high-frequency signal transmission paths which include the lead pin 116a or the like and the conductor pattern 202a or the like is suppressed, so that deterioration of the optical modulation characteristic (for example, a high-frequency characteristic such as an eye pattern extinction ratio or a jitter) in the optical modulation element 102 can be prevented.

Further, in this embodiment, the extension portion 220 is provided so as to enclose the lead pins 116a, 116b, 116c, and 116d, and therefore, the connection portions 204a, 204b, 204c, and 204d and the vicinities thereof are effectively shielded, and thus the electromagnetic radiation from these portions is further suppressed, so that it is possible to further sufficiently prevent the deterioration of the optical modulation characteristic in the optical modulation element 102.

In this embodiment, the extension portion 220 is set to extend along the length direction of the lead pins 116a, 116b, 116c, and 116d over a length equal to or longer than the entire length of the lead pin in the case 114a (FIG. 3). However, a position range in which the extension portion 220 extends along the length direction of the lead pin 116a or the like is not limited thereto and can be set to be any position range as long as the design characteristic impedance of the portions of the connection portions 204a, 204b, 204c, and 204d (or the portion and a peripheral portion thereof) is larger than the characteristic impedance of the lead pins 116a, 116b, 116c, and 116d and the conductor patterns 202a, 202b, 202c, and 202d. For example, a configuration can be made in which the position range of the extension portion 220 is set to be a position range which includes the position of the connection portion 204a or the like (or the position of the relay substrate 118) along the length direction of the lead pin 116a or the like and the length of the position range is set to be a length less than the entire length of the lead pin or a predetermined length (for example, a length exceeding a distance corresponding to the thickness (the film thickness) of the conductor pattern 202a or the like formed on the relay substrate 118). The "position range which includes the position of the connection portion 204a or the like" as referred to herein represents a positional relationship in which the connection portion 204a is included in the extension portion 220 when the extension portion 220 and the connection portion 204a are seen through from the left side in FIG. 2B, for example.

Further, in this embodiment, in FIG. 2A and FIG. 3, the extension portion 220 is drawn such that an upper end portion (an end portion farthest from the bottom surface of the case 114a) thereof is higher than an upper end portion of the lead pin 116a or the like. However, there is no limitation thereto, and the upper end portion of the extension portion 220 may be lower than the upper end portion of the lead pin 116a or the like.

Further, in this embodiment, the extension portion 220 is provided so as to continuously enclose a part of the outer periphery of each of the lead pins 116a, 116b, 116c, and 116d, as shown in FIG. 2A and FIG. 3. However, there is no limitation thereto, and the extension portion 220 can have any shape as long as the design characteristic impedance of the portions of the connection portions 204a, 204b, 204c, and 204d (or the connection portion and a peripheral portion thereof) is larger than the characteristic impedance of the lead pins 116a, 116b, 116c, and 116d and the conductor patterns 202a, 202b, 202c, and 202d. For example, the extension portion 220 may be formed as a plurality of columnar projections rising from the case 114a along the length direction of the lead pin 116a or the like. Further, the extension portion 220 maybe configured as a separate body from the case 114a and be incorporated in the case 114a at the time of manufacturing of the optical modulator 100 and fixed to the case 114a with solder, for example.

Further, in a case of configuring the extension portion so as to enclose each of the lead pins 116a, 116b, 116c, and 116d, similar to this embodiment, in addition to the configuration in which the extension portion is provided so as to continuously enclose a part of the outer periphery of each of the lead pins 116a, 116b, 116c, and 116d (refer to FIG. 2A and FIG. 3), as in this embodiment, for example, the extension portion may be configured of a plurality of columnar projections as described above and configured so as to discretely enclose a part of the outer periphery of each of the lead pins 116a, 116b, 116c, 116d by each of the columnar projections.

Further, in this embodiment, the extension portion 220 is in contact with the relay substrate 118 (refer to FIG. 2A). However, there is not limitation thereto, and the extension portion 220 can be provided so as not to be in contact with the relay substrate 118 as long as the design characteristic impedance of the portions of the connection portions 204a, 204b, 204c, and 204d (or the connection portion and a peripheral portion thereof) is larger than the characteristic impedance of the lead pins 116a, 116b, 116c, and 116d and the conductor patterns 202a, 202b, 202c, and 202d.

Next, modification examples of the optical modulator according to the first embodiment will be described using FIG. 4A to FIG. 11B.

First Modification Example

First, a first modification example of the optical modulator 100 according to the first embodiment will be described. An optical modulator 400 according to the first modulation example has the same configuration as the optical modulator 100. However, in the optical modulator 400 according to this modulation example, portions facing each other across the lead pin 116a or the like, of the extension portion 220, are electrically connected to each other so as to accross over the corresponding lead pin 116a or the like by a conductive wire (for example, a gold wire) that is an electric conductor.

Figure 4A:
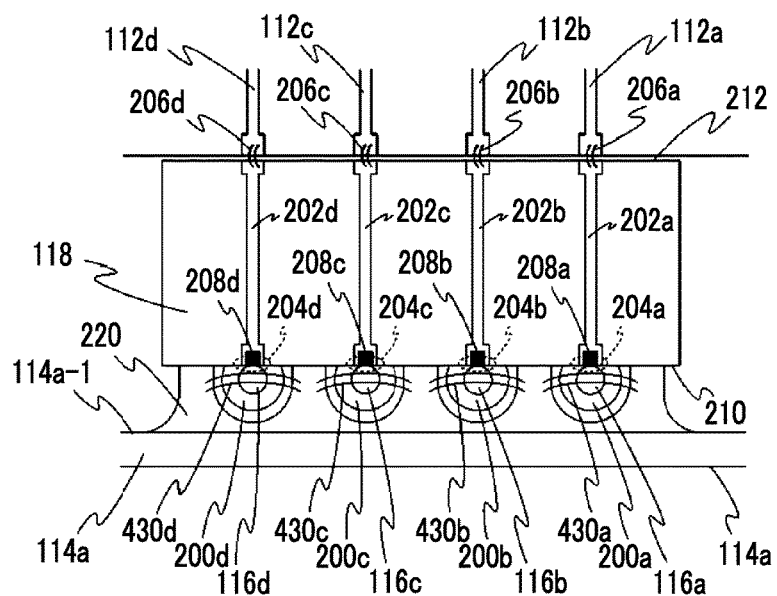
FIG. 4A is a partial detail view showing a configuration of the periphery of a relay substrate of an optical modulator according to a first modification example of the optical modulator according to the first embodiment.
Figure 4B:
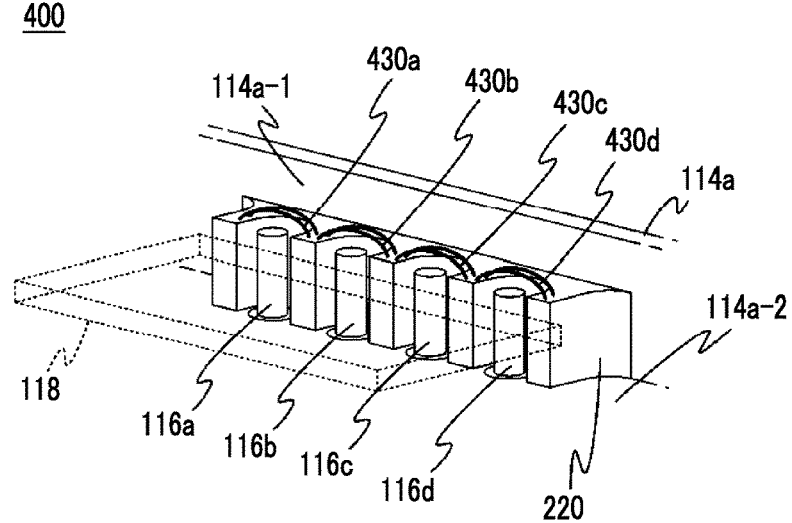
FIG. 4B is a perspective view showing a partial detail of the periphery of an extension portion provided at a case of the optical modulator according to the first modification example of the optical modulator according to the first embodiment.

FIG. 4A is a partial detail view showing the configuration of the periphery of the relay substrate 118 of the optical modulator 400 according to this modification example and is a diagram corresponding to FIG. 2A in the first embodiment. Further, FIG. 4B is a perspective view showing a partial detail of the periphery of the extension portion 220 provided at the case 114a and is a diagram corresponding to FIG. 3 in the first embodiment. The configuration of the optical modulator 400 according to this modification example is the same as that of the optical modulator 100 except that the optical modulator 400 is provided with conductive wires 430a, 430b, 430c, and 430d (described later), and therefore, with respect to the constituent elements other than the conductive wires 430a, 430b, 430c, and 430d, the description in the optical modulator 100 described above is cited.

As shown in FIG. 4A and FIG. 4B, in the optical modulator 400, portions facing each other across each of the lead pins 116a, 116b, 116c, and 116d, of the extension portion 220, are electrically connected to each other so as to accross over each of the lead pins 116a, 116b, 116c, and 116d by each of the conductive wires 430a, 430b, 430c, and 430d. Here, the conductive wires 430a, 430b, 430c, and 430d can be, for example, gold wires.

In this way, it is possible to accurately match the characteristic impedance in the connection portions 204a, 204b, 204c, and 204d (or the connection portion and a peripheral portion thereof) with the characteristic impedance of the lead pin 116a or the like and the conductor pattern 202a or the like by adjusting it by the materials, the shapes, the wiring routes, or the like of the conductive wires 430a, 430b, 430c, and 430d which across over the corresponding lead pins 116a, 116b, 116c, and 116d, respectively.

More specifically, for example, the characteristic impedance of the connection portion 204a can be adjusted (for example, adjusted in a direction in which the characteristic impedance becomes small compared to a case where the wire is not present) by the material, the thickness, the length, the number, and/or the wiring route relative to the position of the lead pin 116a, of the conductive wire 430a straddling the lead pin 116a (for example, the length of the conductive wire 430a which overlaps the upper surface of the lead pin 116a when the upper surface of the lead pin 116a (an end portion or an end surface along the length direction of the lead pin 116a) is looked down toward the bottom surface of the case 114a, and/or the distance from the portion farthest from the upper surface of the lead pin 116a, of the conductive wire 430a, to the upper surface of the lead pin 116a, or the height of the highest point of an arc (or a curve) of the conductive wire 430a provided so as to form the arc (or the curve) toward the upper side of the lead pin 116a).

In FIG. 4A and FIG. 4B, each of the conductive wires 430a, 430b, 430c, and 430d is provided to be composed of two wires. However, the number of the conductive wires can be set to be a different number of zero or more according to the magnitude of the difference between the characteristic impedance after the corresponding lead pin 116a or the like and the conductor pattern 202a or the like are connected to each other, in each of the connection portions 204a, 204b, 204c, and 204d, and the characteristic impedance of the lead pin 116a or the like and the conductor pattern 202a or the like.

Second Modification Example

Next, a second modification example of the optical modulator 100 according to the first embodiment will be described. An optical modulator 500 according to the second modulation example has the same configuration as the optical modulator 100. However, in the optical modulator 500, the portions facing each other across the lead pin 116a or the like, of the extension portion 220, and the ground pattern on the relay substrate 118 are electrically connected to each other by a conductive wire (for example, a gold wire) which is an electric conductor.

Figure 5:
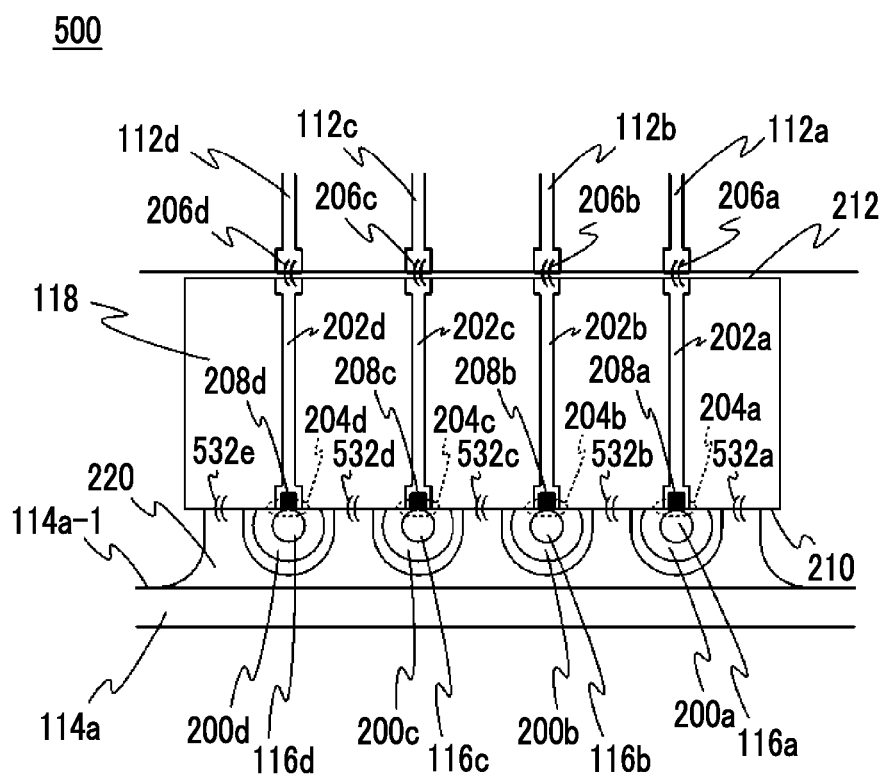
FIG. 5 is a partial detail view showing a configuration of the periphery of a relay substrate of an optical modulator according to a second modification example of the optical modulator according to the first embodiment.

FIG. 5 is a partial detail view showing the configuration of the periphery of the relay substrate 118 of the optical modulator 500 according to this modification example and is a diagram corresponding to FIG. 2A in the first embodiment. The configuration of the optical modulator 500 according to this modification example is the same as that of the optical modulator 100 except that the optical modulator 500 is provided with conductive wires 532a, 532b, 532c, and 532d (described later), and therefore, with respect to the constituent elements other than the conductive wires 532a, 532b, 532c, and 532d, the description in the optical modulator 100 described above is cited.

As shown in FIG. 5, in the optical modulator 500, the portions facing each other across the lead pin 116a or the like (that is, five portions which are in contact with the relay substrate 118), of the extension portion 220, are electrically connected to the ground patterns (not shown in the drawings) provided on the relay substrate 118 by the conductive wires 532a, 532b, 532c, and 532d, respectively. Here, the conductive wires 532a, 532b, 532c, and 532d can be, for example, gold wires.

In this way, it is possible to accurately match the characteristic impedance in the connection portions 204a, 204b, 204c, and 204d with the characteristic impedance of the lead pin 116a or the like and the conductor pattern 202a or the like by finely adjusting it by the materials, the number, the shapes (the thickness or the length), the wiring routes (for example, the height of the highest point of an arc (or a curve) of the conductive wire 532a or the like provided so as to form the arc (or the curve) toward the upper side of the relay substrate 118), or the like of the conductive wires 532a, 532b, 532c, and 532d.

In the configuration shown in FIG. 5, only the conductive wires 532a, 532b, 532c, and 532d are used. However, there is no limitation thereto, and the configuration shown in FIG. 5 and the configuration shown in FIG. 4A and FIG. 4B may be combined with each other. That is, in the configuration shown in FIG. 5, it is possible to roughly adjust the characteristic impedance of the connection portions 204a, 204b, 204c, and 204d by electrically connecting the portions face each other across the lead pin 116a or the like of the extension portion 220 so as to accross over the lead pin 116a or the like, by using conductive wires corresponding to the conductive wires 430a, 430b, 430c, and 430d shown in FIG. 4A and FIG. 4B, and perform fine adjustment of the characteristic impedance by using the conductive wires 532a, 532b, 532c, and 532d.

Further, in FIG. 5, each of the conductive wires 532a, 532b, 532c, and 532d is provided to be composed of two wires. However, the number of the conductive wires can be set to be a different number of zero or more according to the magnitude of the difference between the characteristic impedance after the corresponding lead pin 116a or the like and the conductor pattern 202a or the like are connected to each other, in each of the connection portions 204a, 204b, 204c, and 204d, and the characteristic impedance of the lead pin 116a or the like and the conductor pattern 202a or the like.

Third Modification Example

Next, a third modification example of the optical modulator 100 according to the first embodiment will be described. An optical modulator according to the third modification example has the same configuration as the optical modulator 100 according to the first embodiment. However, the optical modulator according to this modulation example has a case 614a (described later) which is provided with an extension portion 620 (described later) having a different shape from the extension portion 220, instead of the case 114a which is provided with the extension portion 220.

Figure 6A:
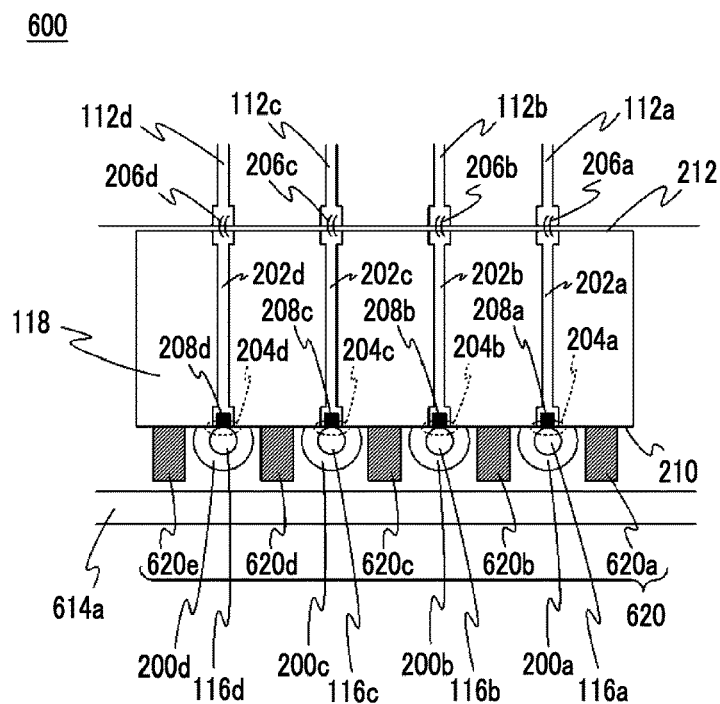
FIG. 6A is a partial detail view showing a configuration of the periphery of a relay substrate of an optical modulator according to a third modification example of the optical modulator according to the first embodiment.

FIG. 6A is a partial detail view showing the configuration of the periphery of the relay substrate 118 of an optical modulator 600 according to this modification example and is a diagram corresponding to FIG. 2A in the first embodiment. The optical modulator 600 according to this modification example has the case 614a which is provided with the extension portion 620 (the hatched portion in the drawing) having a different shape from the extension portion 220 in the optical modulator 100 according to the first embodiment, as described above.

Figure 6B:
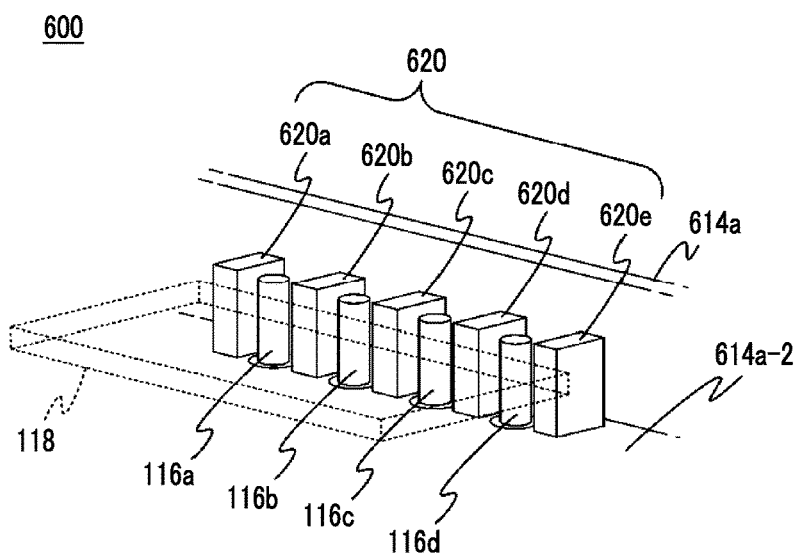
FIG. 6B is a perspective view showing a partial detail of the periphery of an extension portion provided at a case of the optical modulator according to the third modification example of the optical modulator according to the first embodiment.

FIG. 6B is a perspective view showing a partial detail of the periphery of the extension portion 620 provided at the case 614a and is a diagram corresponding to FIG. 3 in the first embodiment. The configuration of the optical modulator 600 according to this modification example is the same as that of the optical modulator 100 except that the optical modulator 600 is provided with the case 614a having the extension portion 620 (described later), instead of the case 114a, and therefore, with respect to the constituent elements other than the extension portion 620 and the case 614a, the description in the optical modulator 100 described above is cited.

The extension portion 620 does not have a shape which encloses the lead pins 116a, 116b, 116c, and 116d like the extension portion 220, and is configured of five columnar projections 620a, 620b, 620c, 620d, and 620e which rise from a bottom surface 614a-2 of the case 614a and extend along the length direction of the lead pin so as to interpose each of the lead pins 116a, 116b, 116c, and 116d therebetween. In this modification example, the extension portion 620 is formed integrally with the case 614a in advance as a part of the case 614a. Further, in this modification example, the columnar projections 620a, 620b, 620c, 620d, and 620e configuring the extension portion 620 are configured so as to come into contact with the lead pin-side edge 210 of the relay substrate 118.

Further, the optical modulator 600 is configured such that due to providing the extension portion 620, the design (or theoretical) characteristic impedance of the portions of the connection portions 204a, 204b, 204c, and 204d (or the connection portion and a peripheral portion thereof) before the lead pins 116a, 116b, 116c, and 116d and the conductor patterns 202a, 202b, 202c, and 202d are connected to each other by the solder 208a, 208b, 208c, and 208d becomes a value (for example, 53 Ω) larger than the characteristic impedance (in this embodiment, 50 Ω) of the lead pins 116a, 116b, 116c, and 116d and the conductor patterns 202a, 202b, 202c, and 202d, similar to the case of the optical modulator 100.

In this way, in the optical modulator 600, similar to the optical modulator 100 according to the first embodiment, the characteristic impedance of the portions of the connection portions 204a, 204b, 204c, and 204d (or the connection portion and a peripheral portion thereof) after the manufacturing of the optical modulator 600 almost coincides with the characteristic impedance of the lead pins 116a, 116b, 116c, and 116d and the conductor patterns 202a, 202b, 202c, and 202d, and thus it is possible to suppress the electromagnetic radiation in the connection portions and the vicinity thereof. As a result, occurrence of noise due to crosstalk through the electromagnetic radiation between the respective high-frequency signal transmission circuits which include the connection portions 204a, 204b, 204c, and 204d is suppressed, so that deterioration of the optical modulation characteristic (for example, a high-frequency characteristic such as an eye pattern extinction ratio or a jitter) in the optical modulation element 102 can be prevented. Further, the lead pins 116a, 116b, 116c, and 116d are shielded by the five columnar projections 620a, 620b, 620c, 620d, and 620e disposed so as to interpose each of the lead pins 116a, 116b, 116c, and 116d therebetween, and therefore, the crosstalk between the high-frequency signal transmission circuits is suppressed by the shielding effect as well.

In this modification example, the columnar projections 620a, 620b, 620c, 620d, and 620e configuring the extension portion 620 extend over a length equal to or longer than the entire length of the lead pin along the length direction of the lead pins 116a, 116b, 116c, and 116d in the case 614a (FIG. 6B). However, the position range in which the columnar projection 620a or the like configuring the extension portion 620 extends along the length direction of the lead pin 116a or the like is not limited thereto and can be set to be any position range as long as the design characteristic impedance of the portions of the connection portions 204a, 204b, 204c, and 204d (or the portion and a peripheral portion thereof) becomes larger than the characteristic impedance of the lead pins 116a, 116b, 116c, and 116d and the conductor patterns 202a, 202b, 202c, and 202d. For example, the position range of the columnar projection 620a or the like configuring the extension portion 620 is set to be a position range which includes the position of the connection portion 204a or the like (or the position of the relay substrate 118) along the length direction of the lead pin 116a or the like, and the length of the position range can be set to be a length less than the entire length of the lead pin or set to be a predetermined length (for example, a length exceeding the distance corresponding to the film thickness of the conductor pattern 202a or the like formed on the relay substrate 118).

Further, also in this modification example, similar to the first modification example, portions facing each other across each of the lead pins 116a, 116b, 116c, and 116d of the columnar projections 620a, 620b, 620c, 620d, and 620e, are electrically connected to each other by a conductive wire so as to accross over each of the lead pins 116a, 116b, 116c, and 116d, whereby it is possible to adjust the characteristic impedance of the connection portions 204a, 204b, 204c, and 204d (or the connection portion and the periphery thereof).

Further, also in this modification example, similar to the second modification example, by electrically connecting the ground patterns (not shown in the drawings) provided on the relay substrate 118 with the columnar projections 620a, 620b, 620c, 620d, and 620e by a conductive wire, it is possible to finely adjust the characteristic impedance of the connection portions 204a, 204b, 204c, and 204d (or the connection portion and the periphery thereof).

Fourth Modification Example

Next, a fourth modification example of the optical modulator 100 according to the first embodiment will be described. An optical modulator according to the fourth modification example has the same configuration as the optical modulator 600 according to the third modification example. However, the optical modulator according to this modulation example has a case which is provided with an extension portion having a different shape or disposition from the extension portion 620, instead of the case 614a which is provided with the extension portion 620.

Figure 7:
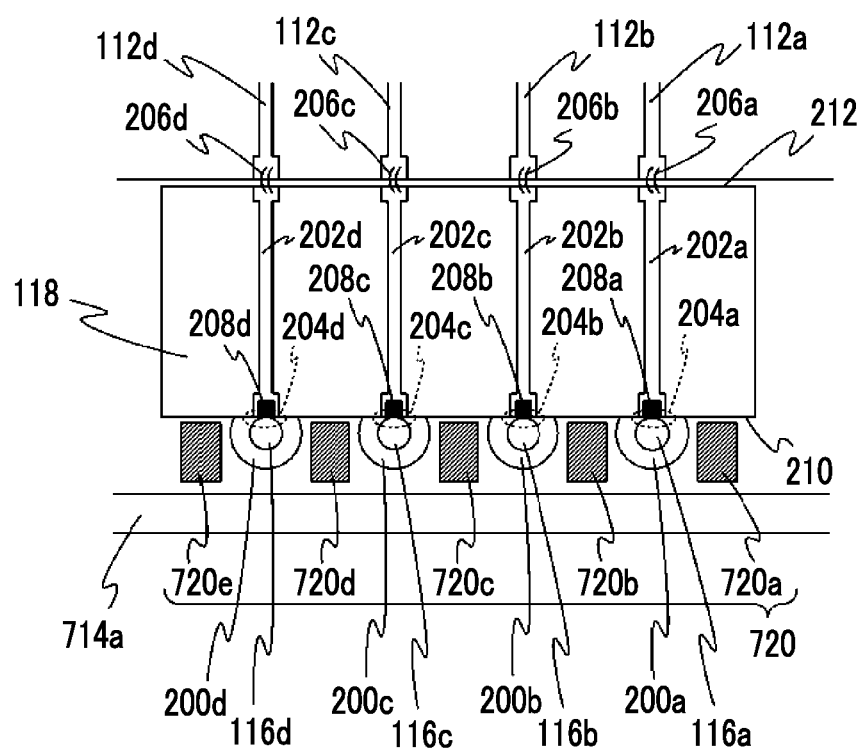
FIG. 7 is a partial detail view showing a configuration of the periphery of a relay substrate of an optical modulator according to a fourth modification example of the optical modulator according to the first embodiment.

FIG. 7 is a partial detail view showing the configuration of the periphery of the relay substrate 118 of an optical modulator 700 according to this modification example and is a diagram corresponding to FIG. 6A in the fourth modification example. The optical modulator 700 according to this modification example has a case 714a which is provided with an extension portion 720 (the hatched portion in the drawing) having a different shape or disposition from the extension portion 620, as described above. The configuration of the optical modulator 700 according to this modification example is the same as that of the optical modulator 100 except that the optical modulator 700 is provided with the case 714a having the extension portion 720, instead of the case 114a, and therefore, with respect to the constituent elements other than the extension portion 720 and the case 714a, the description in the optical modulator 100 described above is cited.

The extension portion 720 is configured of five columnar projections 720a, 720b, 720c, 720d, and 720e which are formed integrally with the case 714a, rise from a bottom surface of the case 714a, and extend along the length direction of the lead pin so as to interpose each of the lead pins 116a, 116b, 116c, and 116d therebetween, similar to the extension portion 620 in the third modification example. However, the columnar projections 720a, 720b, 720c, 720d, and 720e are disposed at positions which are not in contact with the lead pin-side edge 210 of the relay substrate 118, unlike the columnar projections 620a, 620b, 620c, 620d, and 620e of the extension portion 620.

Further, the optical modulator 700 is configured such that due to providing the extension portion 720, the design (or theoretical) characteristic impedance of the portions of the connection portions 204a, 204b, 204c, and 204d (or the connection portion and a peripheral portion thereof) before the lead pins 116a, 116b, 116c, and 116d and the conductor patterns 202a, 202b, 202c, and 202d are connected to each other by the solder 208a, 208b, 208c, and 208d becomes a value (for example, 53 Ω) larger than the characteristic impedance (in this embodiment, 50 Ω) of the lead pins 116a, 116b, 116c, and 116d and the conductor patterns 202a, 202b, 202c, and 202d, similar to the case of the optical modulator 100.

In this way, in the optical modulator 700, similar to the optical modulator 100 according to the first embodiment, the characteristic impedance of the portions of the connection portions 204a, 204b, 204c, and 204d (or the connection portion and a peripheral portion thereof) after the manufacturing of the optical modulator 700 almost coincides with the characteristic impedance of the lead pin 116a or the like and the conductor pattern 202a or the like, and thus it is possible to suppress the electromagnetic radiation in the connection portions and the vicinity thereof. As a result, occurrence of noise due to crosstalk through the electromagnetic radiation between the respective high-frequency signal transmission circuits which include the connection portions 204a, 204b, 204c, and 204d is suppressed, so that deterioration of the optical modulation characteristic (for example, a high-frequency characteristic such as an eye pattern extinction ratio or a j fitter) in the optical modulation element 102 can be prevented. Further, the lead pins 116a, 116b, 116c, and 116d are shielded by the five columnar projections 720a, 720b, 720c, 720d, and 720e disposed so as to interpose each of the lead pins 116a, 116b, 116c, and 116d therebetween, and therefore, the crosstalk between the high-frequency signal transmission circuits is suppressed by the shielding effect as well.

In particular, as described above, in this modification example, the columnar projections 720a, 720b, 720c, 720d, and 720e configuring the extension portion 720 are disposed at positions which are not in contact with the relay substrate 118, and therefore, the distance between the relay substrate 118 and the columnar projection 720a or the like can also be used as a design parameter, so that the design freedom of the characteristic impedance of the portions of the connection portions 204a, 204b, 204c, and 204d (or the connection portion and a peripheral portion thereof) is increased.

Also in this modification example, similar to the first modification example and the second modification example, a conductive wire corresponding to the conductive wire 430a or the like in the first modification example and/or a conductive wire corresponding to the conductive wire 532a or the like in the second modification example is disposed at the same position as the position shown in the first modification example and/or the second modification example, so that it is possible to adjust the characteristic impedance of the portions of the connection portions 204a, 204b, 204c, and 204d (or the portion and a peripheral portion thereof). Further, also in this modification example, it is possible to configure an optical modulator in which an extension portion and a case are configured as separate bodies and the extension portion is incorporated in the case.

Fifth Modification Example

Next, a fifth modification example of the optical modulator 100 according to the first embodiment will be described. An optical modulator according to the fifth modulation example has the same configuration as the optical modulator 100 according to the first embodiment. However, the optical modulator according to this modulation example is different from the optical modulator 100 in that the optical modulator according to this modulation example is provided with an extension portion and a case respectively formed as separate bodies, instead of the case 114a in which the extension portion 220 is integrally formed.

Figure 8A:
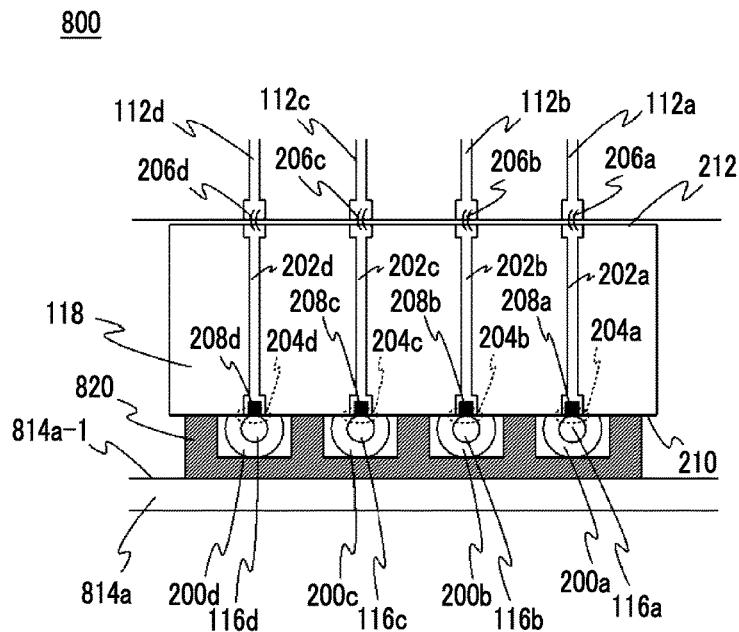
FIG. 8A is a partial detail view showing a configuration of the periphery of a relay substrate of an optical modulator according to a fifth modification example of the optical modulator according to the first embodiment.

FIG. 8A is a partial detail view showing the configuration of the periphery of the relay substrate 118 of an optical modulator 800 according to this modification example and is a partial detail view corresponding to FIG. 2A in the first embodiment. The optical modulator 800 according to this modification example is provided with an extension portion 820 (the hatched portion in the drawing) and a case 814a respectively formed as separate bodies, instead of the case 114a in which the extension portion 220 is integrally formed, as described above. The configuration of the optical modulator 800 according to this modification example is the same as that of the optical modulator 100 except that the optical modulator 800 is provided with the extension portion 820 and the case 814a which are respectively separate bodies, instead of the case 114a in which the extension portion 220 is integrally formed, and therefore, with respect to the constituent elements other than the extension portion 820 and the case 814a, the description in the optical modulator 100 described above is cited.

Figure 8B:
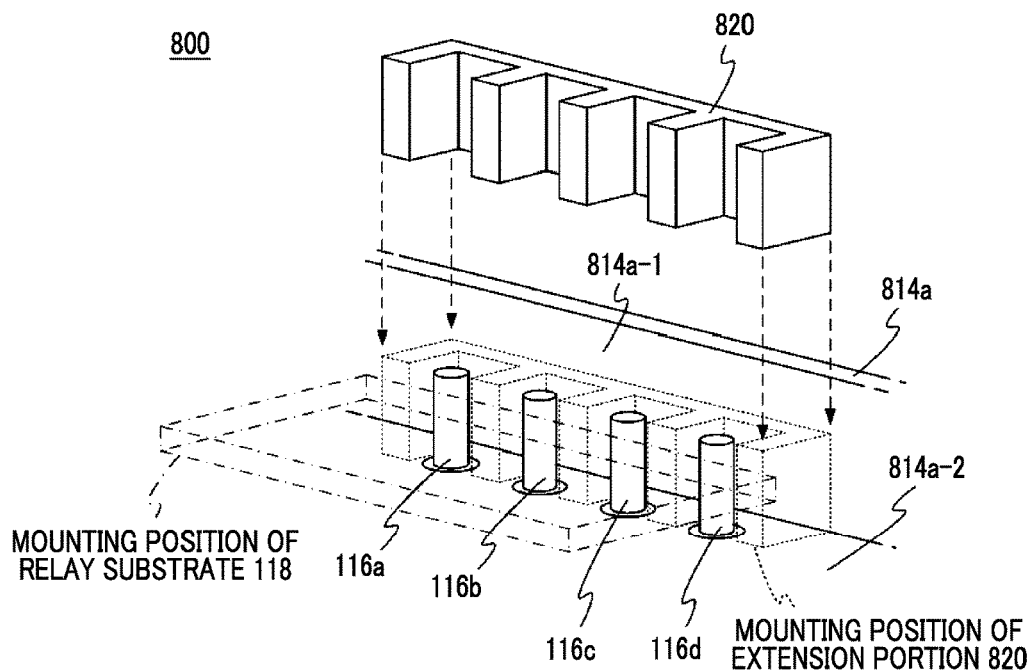
FIG. 8B is a diagram showing a positional relationship when an extension portion is mounted on a case in the optical modulator according to the fifth modification example of the optical modulator according to the first embodiment.

FIG. 8B is a diagram showing the positional relationship between the case 814a, the extension portion 820, and the relay substrate 118 when the extension portion 820 that is a separate body is mounted on the case 814a. In FIG. 8B, in order to facilitate the understanding of the positional relationship, only the case 814a, the extension portion 820, the lead pins 116a, 116b, 116c, and 116d, and the relay substrate 118 are shown, and with respect to other constituent elements, description thereof is omitted.

The extension portion 820 is mounted in the case 814a at the time of manufacturing of the optical modulator 800 and is fixed and electrically connected to an inner side surface 814a-1 and a bottom surface 814a-2 of the case 814a by, for example, solder or a brazing material, as shown in FIG. 8A and FIG. 8B.

Further, the extension portion 820 is configured so as to extend from the inner side surface 814a-1 side of the case 814a and enclose each of the lead pins 116a, 116b, 116c, and 116d in the radial direction of the lead pin in a state of being mounted on the case 814a and is configured so as to extend from the bottom surface 814a-2 side of the case 814a along the length direction of each of the lead pins 116a, 116b, 116c, and 116d.

Further, the optical modulator 800 is configured such that due to providing the extension portion 820, the design (or theoretical) characteristic impedance of the portions of the connection portions 204a, 204b, 204c, and 204d (or the connection portion and a peripheral portion thereof) before the lead pins 116a, 116b, 116c, and 116d and the conductor patterns 202a, 202b, 202c, and 202d are connected to each other by the solder 208a, 208b, 208c, and 208d becomes a value (for example, 53 Ω) larger than the characteristic impedance (in this embodiment, 50 Ω) of the lead pins 116a, 116b, 116c, and 116d and the conductor patterns 202a, 202b, 202c, and 202d, similar to the case of the optical modulator 100.

In this way, in the optical modulator 800, similar to the case of the optical modulator 100, the characteristic impedance of the portions of the connection portions 204a, 204b, 204c, and 204d (or the connection portion and a peripheral portion thereof) after the manufacturing of the optical modulator 800 almost coincides with the characteristic impedance of the lead pin 116a, 116b, 116c, and 116d and the conductor pattern 202a, 202b, 202c, and 202d, and thus the electromagnetic radiation in the connection portions and the vicinity thereof is suppressed, so that deterioration of the optical modulation characteristic in the optical modulation element 102 can be prevented. Further, in this embodiment, the extension portion 820 is provided so as to enclose the lead pins 116a, 116b, 116c, and 116d, and therefore, the connection portions 204a, 204b, 204c, and 204d and the vicinities thereof are effectively shielded, so that it is possible to further suppress the electromagnetic radiation from these portions and further sufficiently prevent deterioration of the optical modulation characteristic in the optical modulation element 102.

Also in this modification example, similar to the first modification example and the second modification example, a conductive wire corresponding to the conductive wire 430a or the like in the first modification example and/or the conductive wire 532a or the like in the second modification example is disposed at the same position as the position shown in the first modification example and/or the second modification example, so that it is possible to adjust the characteristic impedance of the connection portions 204a, 204b, 204c, and 204d (or the connection portion and the periphery thereof).

Sixth Modification Example

Next, an optical modulator which is a sixth modification example of the optical modulator 100 according to the first embodiment will be described. An optical modulator according to the sixth modulation example has the same configuration as the optical modulator 800 according to the fifth modification example and is provided with an extension portion fabricated as a separate body from a case, and the extension portion is fixed and electrically connected to the case at the time of manufacturing of the optical modulator. However, in the extension portion in the sixth modification example, unlike the extension portion 820 in the fifth modification example, a pedestal portion for fixing the relay substrate 118 is formed integrally with the extension portion.

Figure 9:
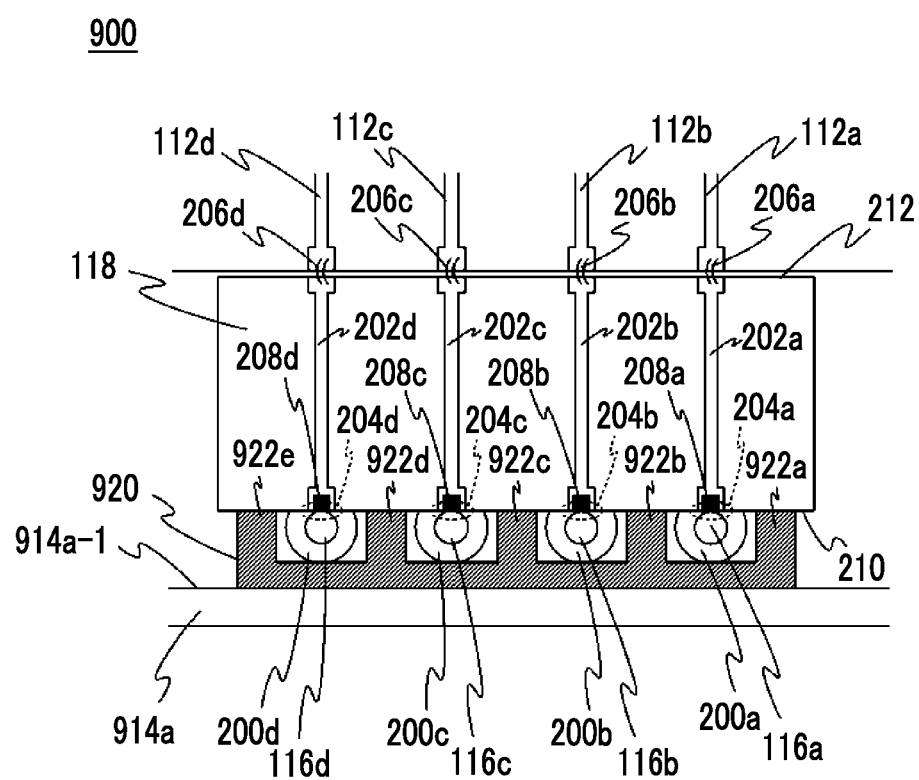
FIG. 9 is a partial detail view showing a configuration of the periphery of a relay substrate of an optical modulator according to a sixth modification example of the optical modulator according to the first embodiment.

FIG. 9 is a partial detail view showing the configuration of the periphery of the relay substrate 118 of an optical modulator 900 according to this modification example and is a partial detail view corresponding to FIG. 8A in the fifth modification example. The optical modulator 900 according to this modification example has the same configuration as the optical modulator 100 according to the first embodiment. However, the optical modulator 900 is provided with an extension portion 920 (the hatched portion in the drawing) and a case 914a respectively formed as separate bodies, instead of the case 114a in which the extension portion 220 is integrally formed.

Figure 10:
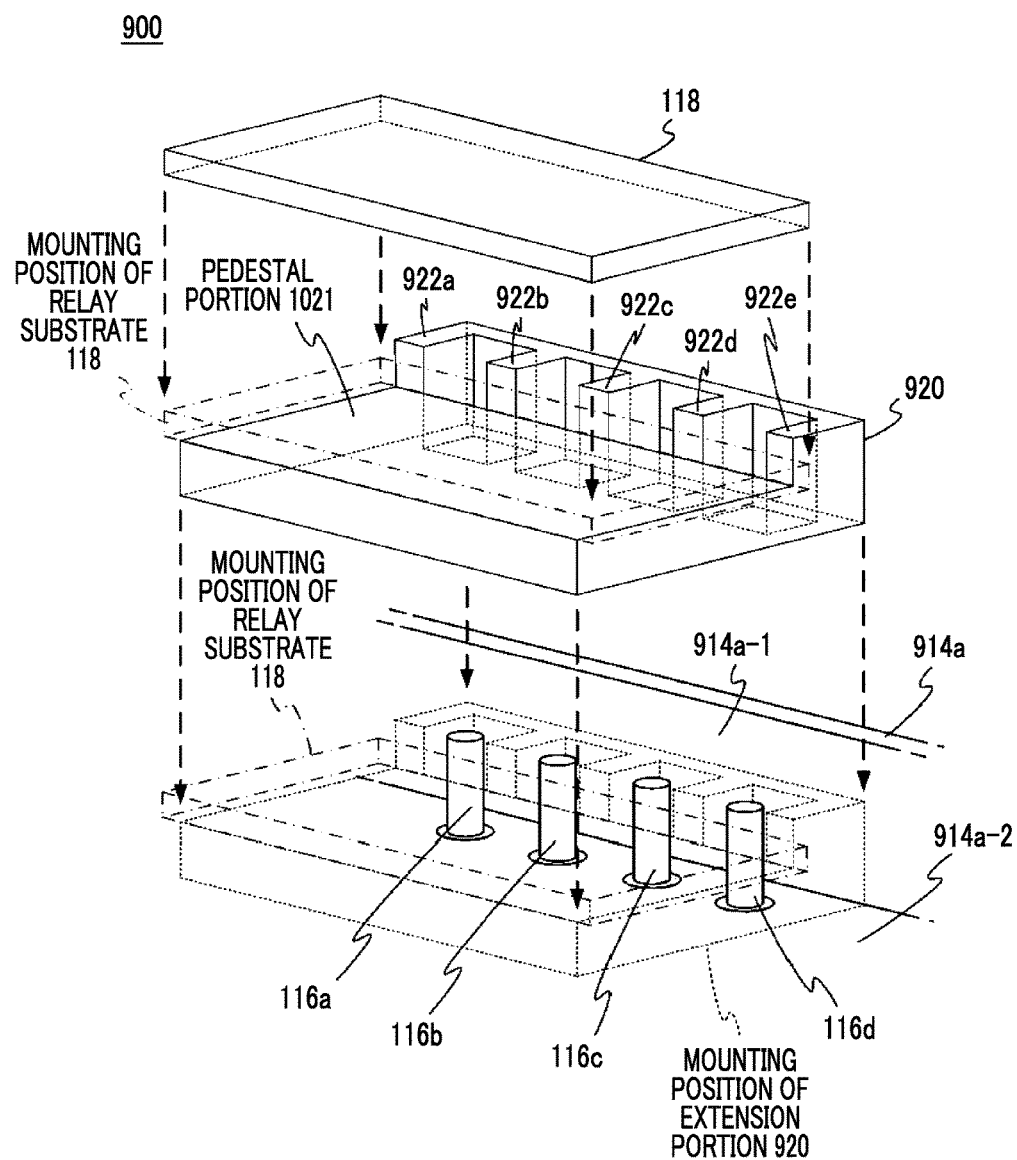
FIG. 10 is a diagram showing the positional relationship between the relay substrate, an extension portion, and a case when the extension portion is mounted on the case in the optical modulator according to the sixth modification example of the optical modulator according to the first embodiment.

FIG. 10 is a diagram showing the positional relationship between the relay substrate 118, the extension portion 920, and the case 914a when the extension portion 920 that is a separate body is mounted on the case 914a . In FIG. 10, in order to facilitate the understanding of the positional relationship, only the case 914a, the extension portion 920, the lead pins 116a, 116b, 116c, and 116d, and the relay substrate 118 are shown, and with respect to other constituent elements, description thereof is omitted.

A pedestal portion 1021 for fixing the relay substrate 118 is formed integrally with the extension portion 920, and the relay substrate 118 is fixed onto the pedestal portion 1021 of the extension portion 920 in advance by, for example, solder, brazing material, or the like. Thereafter, the extension portion 920 on which the relay substrate 118 is mounted in the case 914a, fixed and electrically connected to the case 1014a by, for example, solder or a brazing material having a lower melting point than the solder or the brazing material.

The configuration of the optical modulator 900 according to this modification example is the same as that of the optical modulator 100 except that the optical modulator 900 is provided with the extension portion 920 and the case 914a which are respectively separate bodies, instead of the case 114a in which the extension portion 220 is integrally formed, and the pedestal portion 1021 to which the relay substrate 118 is fixed is formed integrally with the extension portion 920. Therefore, with respect to the constituent elements other than the pedestal portion 1021, the extension portion 920, and the case 914a, the description in the optical modulator 100 described above is cited.

The position of the relay substrate 118 in the extension portion 920 when fixing the relay substrate 118 onto the pedestal portion 1021 of the extension portion 920 is easily determined by bringing the lead pin-side edge 210 of the relay substrate 118 into contact with four raised portions 922a, 922b, 922c, and 922d of the extension portion 920. Further, the fixing of the relay substrate 118 to the extension portion 920 can be performed outside the case 914a, and therefore, when fixing the relay substrate 118 onto the pedestal portion 1021, it is possible to make the thickness of a solder material or a brazing material between the pedestal portion 1021 and the relay substrate 118 uniform by sufficiently increasing the pressing force of the relay substrate 118 against the pedestal portion 1021. As a result, stress on the relay substrate 118, which is caused by expansion or contraction of the solder material or the brazing material in the thickness direction thereof at the time of fluctuation of an environmental temperature or an operation temperature, is reduced, and thus it is possible to improve the reliability of the optical modulator 900.

Further, as the material of the extension portion 920, for example, a material having an intermediate linear expansion coefficient between the linear expansion coefficient of the material of the optical modulation element 102 and the linear expansion coefficient of the material of the case 914a is used, whereby stress on the relay substrate 118, which occurs at the time of fluctuation of an environmental temperature or an operation temperature, is further reduced, and thus the reliability of the optical modulator 900 can be further improved, so that such a configuration is more suitable.

For example, in a case where the relay substrate is made of a ceramic material such as alumina and the case is made of metal such as a SUS material, as the material of the extension portion 920, a material such as a 50 alloy (Fe or Ni) or the like which is an intermediate linear expansion coefficient material can be selected. With such a configuration, occurrence of substrate cracking or the like due to a difference in linear expansion coefficient is suppressed, so that reliability can be improved, and the effect such as relaxation of a restriction on the size of the relay substrate or expansion of design options can be obtained.

Returning to FIG. 9, the extension portion 920 is mounted in the case 914a and fixed and electrically connected to an inner side surface 914a-1 and/or a bottom surface 914a-2 of the case 914a by, for example, solder or a brazing material. Further, the extension portion 920 is configured so as to extend from the inner side surface 914a-1 side of the case 914a and enclose each of the lead pins 116a, 116b, 116c, and 116d in the radial direction of the lead pin in a state of being mounted on the case 914a and is configured so as to extend from the bottom surface 914a-2 side of the case 914a along the length direction of each of the lead pins 116a, 116b, 116c, and 116d.

Further, the optical modulator 900 is configured such that due to providing the extension portion 920, the design (or theoretical) characteristic impedance of the portions of the connection portions 204a, 204b, 204c, and 204d (or the connection portion and a peripheral portion thereof) before the lead pins 116a, 116b, 116c, and 116d and the conductor patterns 202a, 202b, 202c, and 202d are connected to each other by the solder 208a, 208b, 208c, and 208d becomes a value (for example, 53 Ω) larger than the characteristic impedance (in this embodiment, 50 Ω) of the lead pins 116a, 116b, 116c, and 116d and the conductor patterns 202a, 202b, 202c, and 202d, similar to the case of the optical modulator 100.

In this way, in the optical modulator 900, similar to the optical modulator 100, the characteristic impedance of the portions of the connection portions 204a, 204b, 204c, and 204d (or the connection portion and a peripheral portion thereof) after the manufacturing of the optical modulator 900 almost coincides with the characteristic impedance of the lead pin 116a, 116b, 116c, and 116d and the conductor pattern 202a, 202b, 202c, and 202d, and thus the electromagnetic radiation in the connection portions and the vicinity thereof is suppressed, so that deterioration of the optical modulation characteristic in the optical modulation element 102 can be prevented. Further, in this embodiment, the extension portion 920 is provided so as to enclose the lead pins 116a, 116b, 116c, and 116d, and therefore, the connection portions 204a, 204b, 204c, and 204d and the vicinities thereof are effectively shielded, so that it is possible to further suppress the electromagnetic radiation from these portions and further sufficiently prevent deterioration of the optical modulation characteristic in the optical modulation element 102.

Also in this modification example, similar to the first modification example and the second modification example, a conductive wire corresponding to the conductive wire 430a or the like in the first modification example and/or the conductive wire 532a or the like in the second modification example is disposed at the same position as the position shown in the first modification example and/or the second modification example, so that it is possible to adjust the characteristic impedance of the connection portions 204a, 204b, 204c, and 204d (or the connection portion and the periphery thereof).

Seventh Modification Example

Next, a seventh modification example of the optical modulator 100 according to the first embodiment will be described. An optical modulator according to the seventh modulation example has the same configuration as the optical modulator 100 according to the first embodiment. However, the optical modulator according to this modulation example is different from the optical modulator 100 in that the optical modulator according to this modulation example has a case which is provided with an extension portion having a different shape from the extension portion 220, instead of the case 114a which is provided with the extension portion 220.

Figure 11A:
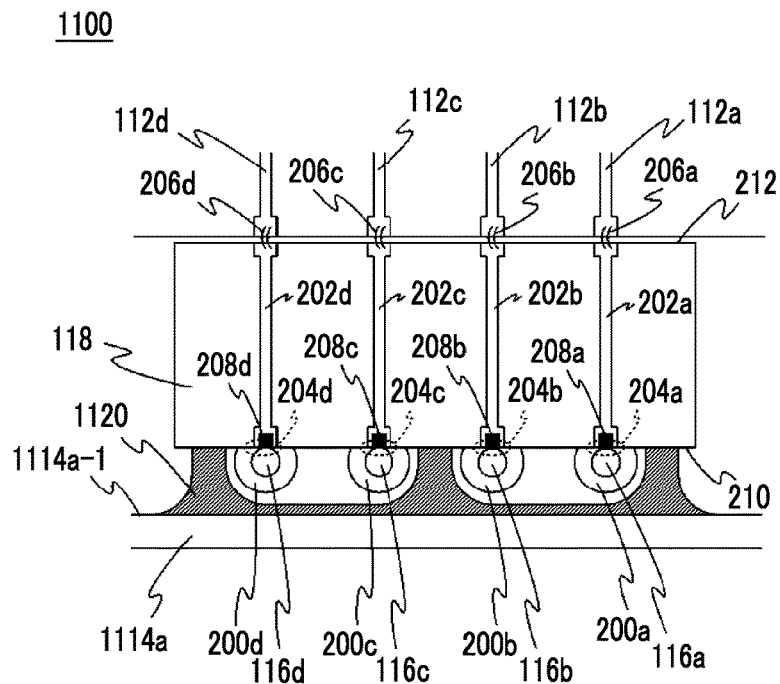
FIG. 11A is a partial detail view showing a configuration of the periphery of a relay substrate of an optical modulator according to a seventh modification example of the optical modulator according to the first embodiment.

FIG. 11A is a partial detail view showing the configuration of the periphery of the relay substrate 118 of an optical modulator 1100 according to this modification example and is a diagram corresponding to FIG. 2A in the first embodiment. The optical modulator 1100 according to this modification example has a case 1114a which is provided with an extension portion 1120 having a different shape from the extension portion 220 in the optical modulator 100 according to the first embodiment, as described above. The configuration of the optical modulator 1100 according to this modification example is the same as that of the optical modulator 100 except that the optical modulator 1100 has the case 1114a which is provided with the extension portion 1120 having a different shape from the extension portion 220, instead of the case 114a in which the extension portion 220 is integrally formed, and therefore, with respect to the constituent elements other than the extension portion 1120 and the case 1114a, the description in the optical modulator 100 described above is cited.

In this modification example, the RF electrodes 112a, 112b, 112c, and 112d are grouped and divided into a group composed of the RF electrodes 112a and 112b and a group composed of the RF electrodes 112c and 112d. Further, the lead pins 116a, 116b, 116c, and 116d corresponding to the RF electrodes 112a, 112b, 112c, and 112d are grouped so as to correspond to the grouping of the RF electrodes and divided into a group composed of the lead pins 116a and 116b and a group composed of the lead pins 116c and 116d.

Further, the extension portion 1120 is configured such that a portion extending from an inner side surface 1114a-1 of the case 1114a encloses each group of the grouped lead pins. Such grouping of the RF electrodes (accordingly, the grouping of the lead pins corresponding thereto) can be performed, for example, based on the grouping of functions in the optical modulation element 102, of the respective optical waveguides, each of which are controlled by each RF electrode 112a or the like formed on the optical modulation element 102.

In the optical modulator 1100 of this modification example which is, for example, a DP-QPSK optical modulator, two Mach-Zehnder optical waveguides on one side (for example, two Mach-Zehnder optical waveguides on the upper side in the optical modulation element 102 shown in FIG. 1A) which modulate polarized lights on one side and two Mach-Zehnder optical waveguides on the other side (for example, two Mach-Zehnder optical waveguides on the lower side in the optical modulation element 102 shown in FIG. 1A) which modulate polarized lights on the other side are respectively grouped as one group.

Further, two RF electrodes (for example, the RF electrode 112a and the RF electrode 112b) which respectively control the two Mach-Zehnder optical waveguides on one side that is a group on one side are set as one RF electrode group, based on the grouping, and the lead pins (for example, the lead pin 116a and the lead pin 116b) corresponding to the two RF electrodes are set as one lead pin group. Further, two RF electrodes (for example, the RF electrode 112c and the RF electrode 112d) which respectively control the two Mach-Zehnder optical waveguides on the other side that is a group on the other side are set as the other RF electrode group, and the lead pins (for example, the lead pin 116c and the lead pin 116d) corresponding to the two RF electrodes are set as the other lead pin group.

Figure 11B:
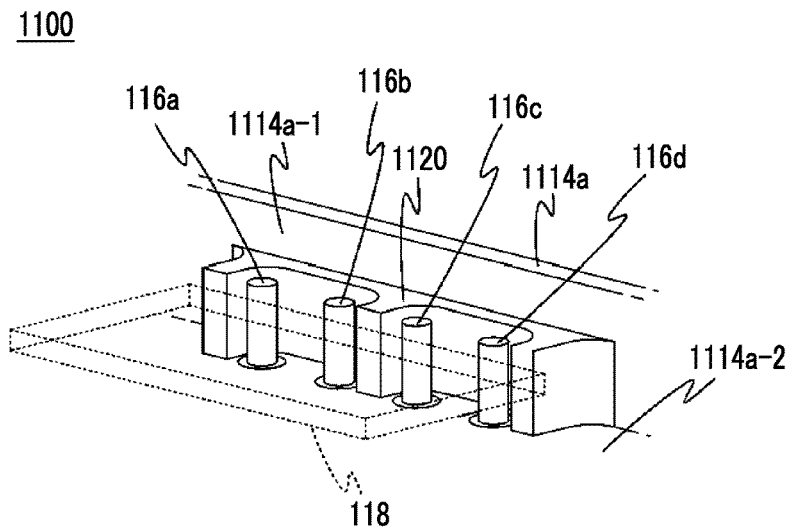
FIG. 11B is a perspective view showing a partial detail of the periphery of an extension portion provided at a case of the optical modulator according to the seventh modification example of the optical modulator according to the first embodiment.

FIG. 11B is a perspective view showing a partial detail of the periphery of the extension portion 1120 provided at the case 1114a. In FIG. 11B, in order to facilitate the understanding of the configuration of the extension portion 1120, only the case 1114a, the extension portion 1120, the lead pins 116a, 116b, 116c, and 116d, and the relay substrate 118 (indicated by a dotted line in the drawing) are shown, and with respect to other constituent elements, description thereof is omitted.

The extension portion 1120 is configured so as to extend from the inner side surface 1114a-1 of the case 1114a, as described above, and enclose the lead pins 116a, 116b, 116c, and 116d in the radial direction of the lead pin for each group (that is, so as to enclose the group composed of the lead pins 116a and 116b and the group composed of the lead pins 116c and 116d). Further, the extension portion 1120 is configured so as to extend from a bottom surface 1114a-2 of the case 1114a along the length direction of each of the lead pins 116a, 116b, 116c, and 116d. In this modification example, the extension portion 1120 is formed integrally with the case 114a in advance as a part of the case 1114a.

Further, the optical modulator 1100 is configured such that due to providing the extension portion 1120, the design (or theoretical) characteristic impedance of the portions of the connection portions 204a, 204b, 204c, and 204d (or the connection portion and a peripheral portion thereof) before the lead pins 116a, 116b, 116c, and 116d and the conductor patterns 202a, 202b, 202c, and 202d are connected to each other by the solder 208a, 208b, 208c, and 208d becomes a value (for example, 53 Ω) larger than the characteristic impedance (in this embodiment, 50 Ω) of the lead pins 116a, 116b, 116c, and 116d and the conductor patterns 202a, 202b, 202c, and 202d, similar to the case of the optical modulator 100.

In this way, in the optical modulator 1100, similar to the optical modulator 100, the characteristic impedance of the portions of the connection portions 204a, 204b, 204c, and 204d (or the connection portion and a peripheral portion thereof) after the manufacturing of the optical modulator 1100 almost coincides with the characteristic impedance of the lead pin 116a, 116b, 116c, and 116d and the conductor pattern 202a, 202b, 202c, and 202d, and thus the electromagnetic radiation in the connection portions and the vicinity thereof can be suppressed. As a result, occurrence of noise due to crosstalk between high-frequency signal transmission circuits which include the connection portions 204a, 204b, 204c, and 204d is suppressed, so that deterioration of the optical modulation characteristic (for example, a high-frequency characteristic such as an eye pattern extinction ratio or a jitter) in the optical modulation element 102 can be prevented.

Further, in the optical modulator 1100, the extension portion 1120 has a simplified configuration compared to the extension portion 220, so as to enclose the lead pins 116a, 116b, 116c, and 116d for each group, and shields the lead pins 116a, 116b, 116c, and 116d from each other's group. Therefore, in the optical modulator 1100, it is possible to prevent, for example, the crosstalk between groups of the high-frequency transmission paths, which greatly affects the modulation characteristic in the optical modulation element 102, while simplifying the configuration of the extension portion 1120, and prevent deterioration of the optical modulation characteristic (for example, a high-frequency characteristic such as an eye pattern extinction ratio or a jitter) in the optical modulation element 102.

Figure 11C:
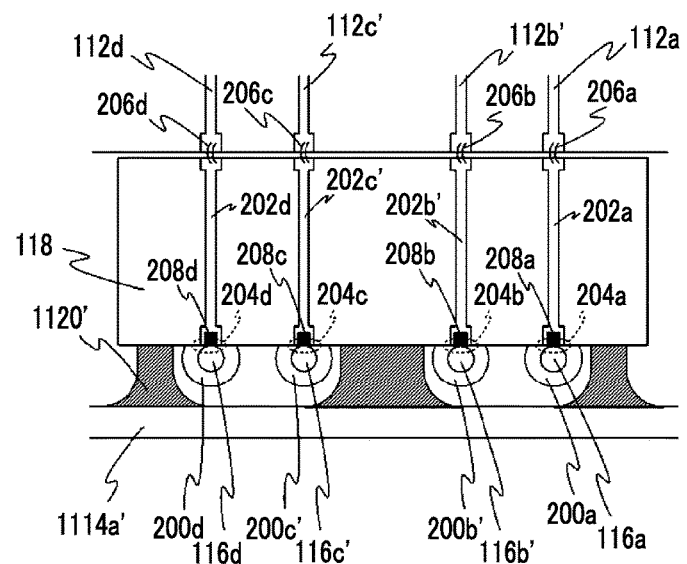
FIG. 11C is a diagram showing another example of the seventh modification example shown in FIG. 11A.

In this modification example, the distance between the lead pins configuring each group (for example, between the lead pin 116a and the lead pin 116b) and the distance between the lead pins adjacent to each other, which belong to different groups, (that is, the lead pin 116b and the lead pin 116c) are the same (FIG. 11A). However, there is no limitation thereto, and for example, as shown in FIG. 11C, the distance between the lead pins configuring each group (for example, the distance between the lead pin 116a and a lead pin 116b' and the distance between a lead pin 116c' and the lead pin 116d) can be set to be different from the distance between the lead pins adjacent to each other, which belong to different groups, (that is, the lead pin 116b' and the lead pin 116c') (for example, the latter can be set to be wider than the former). Further, the distance between the lead pins in the group maybe set to be different for each group.

That is, the extension portion includes a portion which inclusively encloses at least two lead pins adjacent to each other, and the distance between one of the lead pins inclusively enclosed by the enclosing portion and a lead pin which is adjacent to the lead pin and is not inclusively enclosed by the enclosing portion can be set to be wider than the distance between the lead pins inclusively enclosed by the enclosing portion.

Further, in this modification example, the extension portion 1120 is set to extend along the length direction of the lead pins 116a, 116b, 116c, and 116d over a length equal to or longer than the entire length of the lead pin in the case 1114a (FIG. 11B). However, a position range in which the extension portion 1120 extends along the length direction of the lead pin 116a or the like is not limited thereto and can be set to be any position range as long as the design characteristic impedance of the portions of the connection portions 204a, 204b, 204c, and 204d (or the portion and a peripheral portion thereof) is larger than the characteristic impedance of the lead pins 116a, 116b, 116c, and 116d and the conductor patterns 202a, 202b, 202c, and 202d, similar to the optical modulator 100 according to the first embodiment. For example, a configuration can be made in which the position range of the extension portion 220 is set to be a position range which includes the position of the connection portion 204a or the like (or the position of the relay substrate 118) along the length direction of the lead pin 116a or the like and the length of the position range is set to be a length less than the entire length of the lead pin or a predetermined length (for example, a length exceeding a distance corresponding to the film thickness of the conductor pattern 202a or the like formed on the relay substrate 118).

Further, also in this modification example, similar to the first modification example and/or the second modification example, a conductive wire corresponding to the conductive wire 430a or the like in the first modification example and/or the conductive wire 532a or the like in the second modification example is disposed at the same position as the position shown in the first modification example and/or the second modification example, so that it is possible to adjust the characteristic impedance of the connection portions 204a, 204b, 204c, and 204d (or the connection portion and the periphery thereof).

Here, in the seventh modification example, in a case where a conductive wire corresponding to the conductive wire 430a or the like in the first modification example is provided, it is favorable if the portions facing across the grouped lead pins 116a and 116b, of the extension portion 1120, and/or the portions facing across the grouped lead pins 116c and 116d, of the extension portion 1120, may be connected with the conductive wires.

In this case, it is possible to simultaneously change and adjust the characteristic impedance of the portions of two connection portions (for example, 204a and 204b) corresponding to two lead pins (for example, 116a and 116b) configuring one group by the material, the length, the number, or the like of the conductive wire. Further, the characteristic impedance of each portion of the two connection portion 204a and 204b can also be individually adjusted, for example, by adjusting the wiring route relative to the positions of the upper surfaces of the lead pins 116a and 116b, of the conductive wire (for example, the length of each portion of the conductive wires which overlap the upper surfaces of the lead pins 116a and 116b when the upper surface of each of the lead pins 116a and 116b (an end portion or an end surface along a length direction of each of the lead pins 116a and 116b) is looked down toward the bottom surface of the case 114a, and/or the distance from the portion farthest from the upper surface of each of the lead pins 116a and 116b, of the conductive wire, to the corresponding upper surface).

Second Embodiment

Next, a second embodiment of the present invention will be described. This embodiment is an optical transmission apparatus equipped with any one of the optical modulator 100 according to the first embodiment and the optical modulators 400, 500, 600, 700, 800, 900, and 1100 according to the first to seventh modification examples described above.

Figure 12:
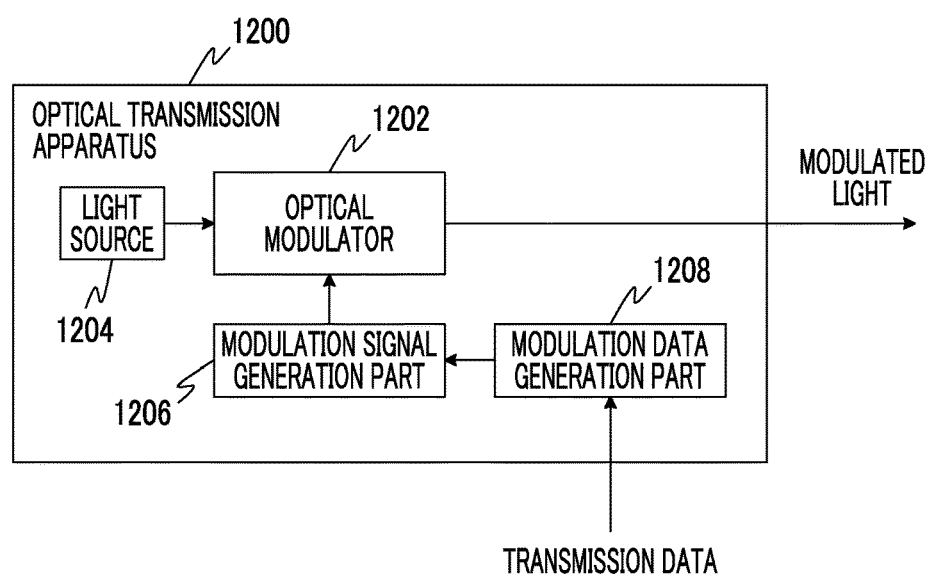
FIG. 12 is a diagram showing a configuration of an optical transmission apparatus according to a second embodiment of the present invention.
Figure 13A:
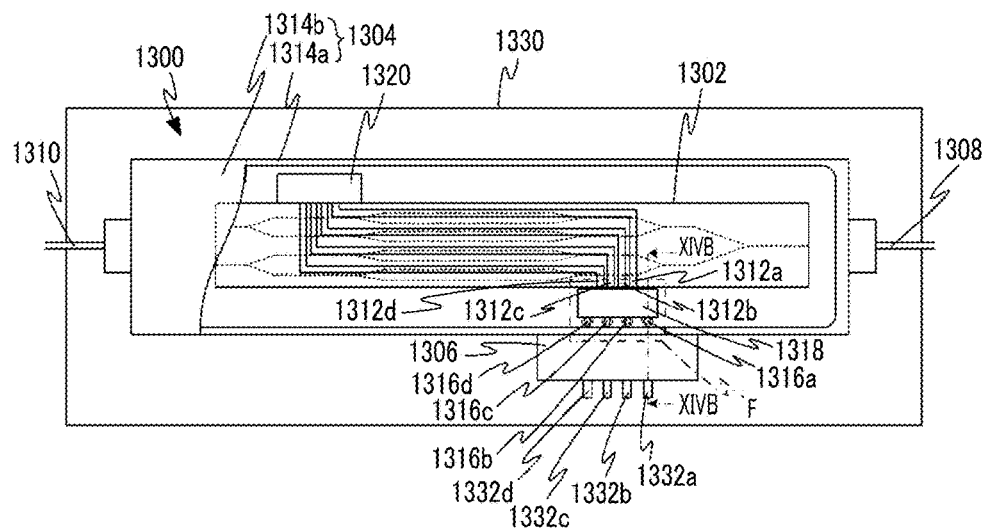
FIG. 13A is a top view of an optical modulator of the related art, showing a configuration of the optical modulator.
Figure 13B:
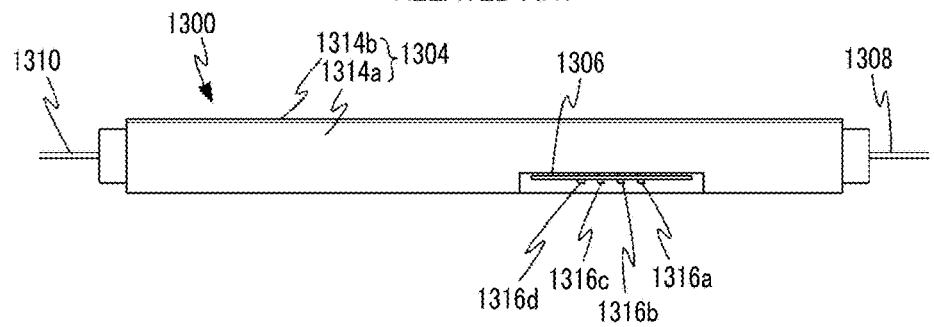
FIG. 13B is a side view of the optical modulator of the related art.
Figure 13C:
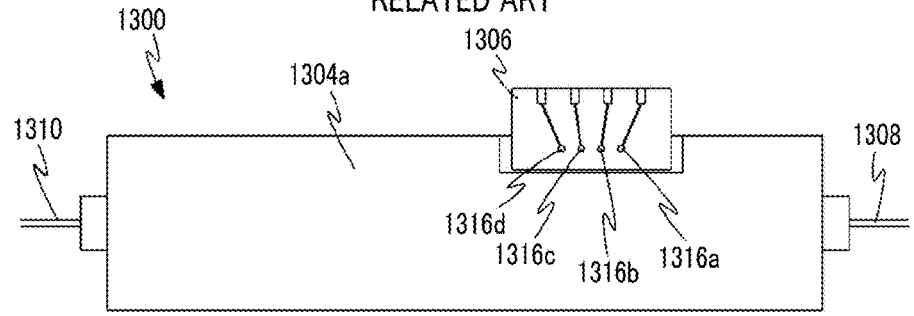
FIG. 13C is a bottom view of the optical modulator of the related art.
Figure 14A:
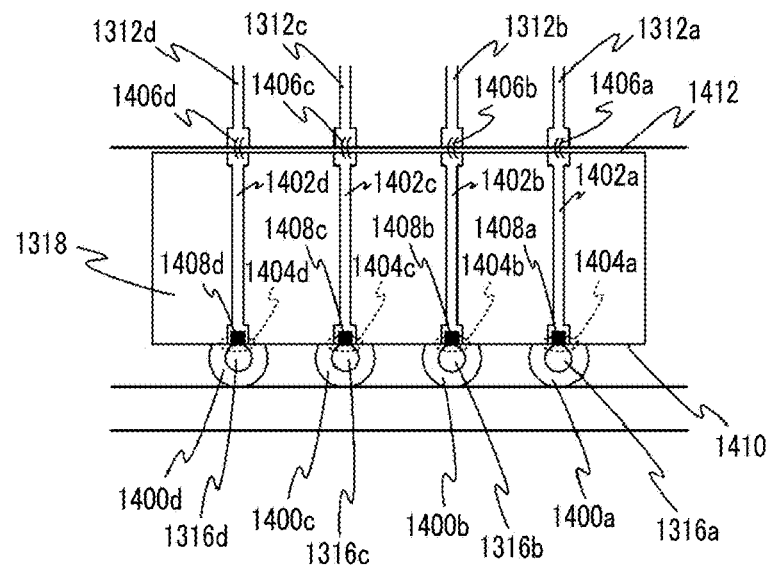
FIG. 14A is a partial detail view of a portion F of the optical modulator shown in FIG. 13A.
Figure 14B:
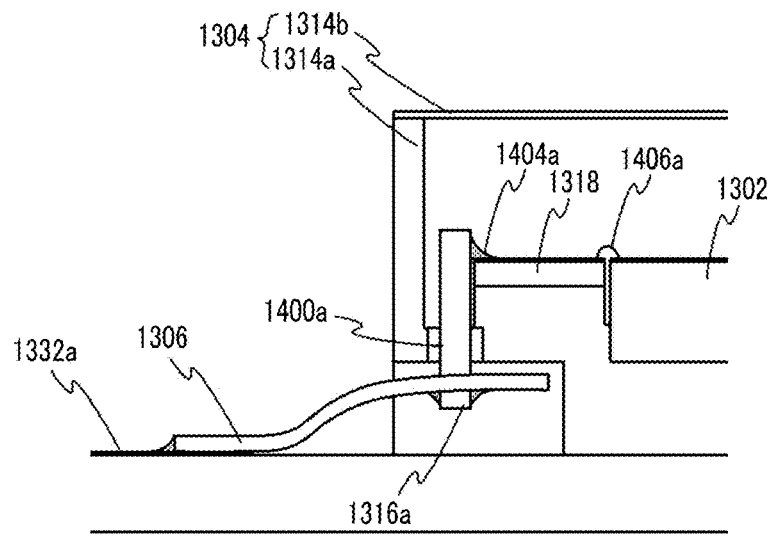
FIG. 14B is a cross-sectional view of the optical modulator taken along line XIVB-XIVB in FIG. 13A and viewed in a direction of an arrow.

FIG. 12 is a diagram showing the configuration of the optical transmission apparatus according to this embodiment. An optical transmission apparatus 1200 has an optical modulator 1202, a light source 1204 to input light to the optical modulator 1202, a modulation signal generation part 1206, and a modulation data generation part 1208.

The optical modulator 1202 can be set to be any one of the optical modulators 100, 400, 500, 600, 700, 800, 900, and 1100 described above. However, in the following description, in order to avoid overlapping description and facilitate understanding, it is assumed that the optical modulator 100 is used as the optical modulator 1202.

The modulation data generation part 1208 receives transmission data which is provided from the outside, generates modulation data (for example, data obtained by converting or processing the transmission data to a predetermined data format) for transmitting the transmission data, and outputs the generated modulation data to the modulation signal generation part 1206.

The modulation signal generation part 1206 is an electronic circuit (a drive circuit) which outputs an electrical signal for causing the optical modulator 1202 to perform a modulation operation, generates a modulation signal that is a high-frequency signal for causing the optical modulator 1202 to perform an optical modulation operation according to the modulation data, based on the modulation data output from the modulation data generation part 1208, and inputs the modulation signal to the optical modulator 1202. The modulation signal is composed of four RF signals corresponding to the four RF electrodes 112a, 112b, 112c, and 112d of the optical modulation element 102 provided in the optical modulator 100 that is the optical modulator 1202.

The four RF signals are input to the lead pins 116a, 116b, 116c, and 116d through the FPC 106 of the optical modulator 100 that is the optical modulator 1202, and are respectively applied to the RF electrodes 112a, 112b, 112c, and 112d through the relay substrate 118.

In this way, the light output from the light source 1204 is modulated by the optical modulator 1202 and becomes modulated light, which is then output from the optical transmission apparatus 1200.

In particular, in the optical transmission apparatus 1200, any one of the optical modulators 100, 400, 500, 600, 700, 800, 900, and 1100 having the configurations described above is used as the optical modulator 1202, and therefore, a stable and good optical modulation characteristic can be secured. Therefore, stable and good transmission characteristics can be realized.

In each of the embodiments described above, the optical modulator which is provided with the optical modulation element using LN as the substrate and having four RF electrodes is shown. However, the present invention is not limited thereto and can also be likewise applied to an optical modulator having a plurality (a number other than four) of RF electrodes, and/or an optical modulator in which materials other than LN are used for the substrate.

As described above, the optical modulator (100 or the like) according to each of the embodiments described above is provided with the optical modulation element (102 or the like) having a signal electrode (112a or the like), the lead pin (116a or the like) for inputting a high-frequency signal, and the relay substrate (118 or the like) on which the conductor pattern (202a or the like) electrically connecting the lead pin and the signal electrode is formed, and further has the conductive extension portion (220 or the like) extending in a range which includes at least the position of the connection portion (204*a* or the like) between the lead pin and the conductor pattern, along the length direction of the lead pin. Further, the optical modulator (100 or the like) is configured such that due to the presence of the extension portion, the design or theoretical characteristic impedance of the connection portion (or the connection portion and a peripheral portion thereof) before the lead pin and the conductor pattern are connected to each other with solder (208*a* or the like) becomes a value larger than the characteristic impedance of the conductor pattern 202*a* or the like.

In this way, in the optical modulator (100 or the like), the characteristic impedance of the connection portion (or the connection portion and a peripheral portion thereof) after the manufacturing of the optical modulator is made to coincide with the characteristic impedance of the conductor pattern 202*a* or the like and the connection portion or the lead pin is shielded, whereby it is possible to prevent deterioration of the optical modulation characteristic in the optical modulation element 102.

What is claimed is:

1. An optical modulator comprising:
   an optical modulation element which is accommodated in a housing and has a signal electrode;
   a lead pin for inputting a high-frequency signal;
   a relay substrate in which a conductor pattern which electrically connects the lead pin and the signal electrode is formed; and
   a conductive extension portion which extends along a length direction of the lead pin in a range which includes at least a position of a connection portion between the lead pin and the conductor pattern,
   wherein the extension portion is electrically connected to the housing.

2. The optical modulator according to claim 1, wherein characteristic impedance of the connection portion in an operating frequency region of the optical modulation element before the lead pin and the conductor pattern are actually electrically connected to each other is higher than characteristic impedance of the lead pin and/or the conductor pattern.

3. The optical modulator according to claim 1, wherein a distance in which the extension portion extends in the range is larger than a thickness of the conductor pattern on the relay substrate.

4. The optical modulator according to claim 1, wherein the extension portion and a ground pattern formed on the relay substrate are electrically connected to each other by an electric conductor.

5. The optical modulator according to claim 1, wherein the extension portion is configured so as to include portions facing each other across the lead pin and enclose at least partially the lead pin in a radial direction of said lead pin by a portion which includes the portions facing each other.

6. The optical modulator according to claim 5, wherein a plurality of the lead pins are provided,
   the extension portion includes a enclosing portion which inclusively encloses at least partially at least two lead pins adjacent to each other, and
   a distance between one of the lead pins inclusively enclosed by the enclosing portion and a lead pin which is adjacent to said one of the lead pins and is not inclusively enclosed said the enclosing portion is wider than a distance between the lead pins inclusively enclosed by said enclosing portion.

7. The optical modulator according to claim 5, wherein the portions facing each other are electrically connected to each other by an electric conductor disposed across an end portion in the length direction of the lead pin.

8. The optical modulator according to claim 1, wherein the extension portion is fabricated as a separate body from the housing and is fixed and electrically connected to the housing.

9. The optical modulator according to claim 8, wherein the extension portion is provided with a pedestal portion for fixing the relay substrate.

10. The optical modulator according to claim 1, wherein the extension portion is in contact with the relay substrate.

11. An optical transmission apparatus comprising:
    the optical modulator according to claim 1; and
    an electronic circuit which outputs an electric signal for causing the optical modulator to perform a modulation operation.

* * * * *